US008846822B2

(12) United States Patent
Yano et al.

(10) Patent No.: US 8,846,822 B2
(45) Date of Patent: *Sep. 30, 2014

(54) CURABLE COMPOSITION

(75) Inventors: Ayako Yano, Takasago (JP); Takahiro Saito, Takasago (JP); Takeshi Yao, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/881,290

(22) PCT Filed: Oct. 24, 2011

(86) PCT No.: PCT/JP2011/074459
§ 371 (c)(1),
(2), (4) Date: Jun. 24, 2013

(87) PCT Pub. No.: WO2012/057092
PCT Pub. Date: May 3, 2012

(65) Prior Publication Data
US 2013/0281632 A1    Oct. 24, 2013

(30) Foreign Application Priority Data
Oct. 27, 2010 (JP) ................................ 2010-241189

(51) Int. Cl.
C08G 65/32 (2006.01)
C08L 101/10 (2006.01)
C08L 63/00 (2006.01)
C08L 67/00 (2006.01)

(52) U.S. Cl.
CPC .................... *C08L 63/00* (2013.01); *C08L 101/10* (2013.01)
USPC .................................................. 525/407

(58) Field of Classification Search
USPC ........................................................ 525/407
See application file for complete search history.

(56) References Cited

U.S. PATENT DOCUMENTS

| | | | |
|---|---|---|---|
| 4,904,732 A | 2/1990 | Iwahara et al. | |
| 4,906,707 A | 3/1990 | Yukimoto et al. | |
| 6,437,071 B1 | 8/2002 | Odaka et al. | |
| 7,144,953 B2 | 12/2006 | Ueda et al. | |
| 2005/0004327 A1 | 1/2005 | Ueda et al. | |
| 2006/0270819 A1 | 11/2006 | Fujimoto | |
| 2007/0173620 A1 | 7/2007 | Kono | |
| 2008/0188624 A1 | 8/2008 | Yano et al. | |
| 2011/0213058 A1* | 9/2011 | Yano ............................. | 524/115 |
| 2013/0281591 A1* | 10/2013 | Yano et al. .................... | 524/296 |

FOREIGN PATENT DOCUMENTS

| JP | 52-073998 A | 6/1977 |
|---|---|---|
| JP | 63-006041 A | 1/1988 |
| JP | 4-57850 A | 2/1992 |
| JP | 5-039428 A | 2/1993 |
| JP | 5-59267 A | 3/1993 |
| JP | 5-117519 A | 5/1993 |
| JP | 09-012860 A | 1/1997 |
| JP | 9-095609 A | 4/1997 |
| JP | 9-095619 A | 4/1997 |
| JP | 9-118818 A | 5/1997 |
| JP | 2687038 B2 | 12/1997 |
| JP | 2708833 B2 | 2/1998 |
| JP | 10-251616 A | 9/1998 |
| JP | 2000-234064 A | 8/2000 |
| JP | 2000-313814 A | 11/2000 |
| JP | 2000-319399 A | 11/2000 |
| JP | 2000-327771 A | 11/2000 |
| JP | 2000-327902 A | 11/2000 |
| JP | 2000-345054 A | 12/2000 |
| JP | 3155035 B2 | 4/2001 |
| JP | 2003-147167 A | 5/2003 |
| JP | 2003-206410 A | 7/2003 |
| JP | 2004-224985 A | 8/2004 |
| JP | 2004-244528 A | 9/2004 |
| JP | 3575132 B2 | 10/2004 |
| JP | 2005-213446 A | 8/2005 |
| JP | 2005-240049 A | 9/2005 |
| JP | 2007-204634 A | 8/2007 |
| JP | 2008-050448 A | 3/2008 |
| JP | 2009-013430 A | 1/2009 |
| JP | 2009-108246 A | 5/2009 |
| JP | 2009-249494 A | 10/2009 |
| JP | 2010-100862 A | 5/2010 |

(Continued)

OTHER PUBLICATIONS

International Search Report for PCT/JP2011/074459, mailing date of Dec. 27, 2011.
Machine translation of JP2009-249494; previously cited Apr. 24, 2013.
Machine translation of JP2010-150381; previously cited Apr. 24, 2013.
Machine translation of JP9-95619; previously cited Apr. 24, 2013.
Machine translation of JP2009-108246; previously cited Apr. 24, 2013.
Machine translation of JP2708833; previously cited Apr. 24, 2013.
Machine translation of JP2687038; previously cited Apr. 24, 2013.

(Continued)

*Primary Examiner* — Terressa M. Boykin
(74) *Attorney, Agent, or Firm* — Westerman, Hattori, Daniels & Adrian, LLP

(57) ABSTRACT

Provided is a curable composition that has low modulus, high elongation and low viscosity, and can be used for building sealing materials. This curable composition includes: an organic polymer (A) containing on average at least 1.4 reactive silyl groups per molecule; and an organic polymer (B) containing on average less than one reactive silyl group per molecule, wherein the number average molecular weight of component (B) is lower than the number average molecular weight of component (A) by at least 3,000, and the ratio (y)/(x) of the number of moles (y) of organic polymers containing only one reactive silyl group per molecule among components (A) and (B) to the number of moles (x) of organic polymers containing at least 2 reactive silyl groups per molecule among components (A) and (B) is not more than 5.

11 Claims, No Drawings

(56) References Cited

FOREIGN PATENT DOCUMENTS

| | | |
|---|---|---|
| JP | 2010-150380 A | 7/2010 |
| JP | 2010-150381 A | 7/2010 |
| JP | 2011-111525 A | 6/2011 |
| WO | 2004/060953 A1 | 7/2004 |
| WO | 2004/092270 A1 | 10/2004 |
| WO | 2005/042607 A1 | 5/2005 |
| WO | 2005/073322 A1 | 8/2005 |
| WO | 2006/070637 A1 | 7/2006 |

OTHER PUBLICATIONS

Machine translation of JP9-95609; previously cited Apr. 24, 2013.
Machine translation of JP3155035; previously cited Apr. 24, 2013.
Machine translation of JP3575132; previously cited Apr. 24, 2013.
Machine translation of JP2005-240049; previously cited Apr. 24, 2013.
Machine translation of JP2007-204634; previously cited Apr. 24, 2013.
Machine translation of JP2005-213446; previously cited Apr. 24, 2013.
Translation of the International Preliminary Report on Patentability (PCT/IB/373) (1 page), (PCT/ISA/237) (3 pages) of International Application No. PCT/JP2011/074459 mailed Dec. 27, 2011.
International Search Report of PCT/JP2011/078375, mailing date of Feb. 21, 2012.
Translation of the International Preliminary Report on Patentability (PCT/IB/338) (1 page), (PCT/IB/373) (1 page) of International Application No. PCT/JP2011/078375 mailed Jun. 27, 2013 (Form PCT/ISA/237) (1 page).
International Preliminary Report on Patentability (Form PCT/IB/373) of International Application No. PCT/JP2009/066734, dated May 10, 2011 with Forms PCT/ISA/237.
International Search Report of PCT/JP2009/066734, mailing date Dec. 22, 2009.
Akisada Endo et al., Plastics haigozai-Kiso to Oyo-(Plastics Additives—Fundamentals and Applications-), Taiseisha Ltd., Nov. 30, 1996. pp. 90-91, with Partial English Translation thereof; Cited in Specification of U.S. Appl. No. 13/121,493.
Office Action dated May 30, 2013, issued in U.S. Appl. No. 13/121,493 (11 pages).
Notice of Allowance dated Nov. 8, 2013, issued in U.S. Appl. No. 13/121,493 (11 pages).

* cited by examiner

CURABLE COMPOSITION

TECHNICAL FIELD

The present invention relates to a curable composition containing one or more organic polymers containing a silicon-containing group which contains a hydroxy or hydrolyzable group bonded to a silicon atom and can form a siloxane bond to be cross-linked (hereinafter referred to also as a "reactive silyl group").

More specifically, the present invention relates to techniques in which the curable composition has good workability and a cured product thereof has low modulus and high elongation when a combination of a reactive silyl group-containing organic polymer (A) and an organic polymer (B) with a small number of reactive silyl groups introduced is used and the ratio between these reactive silyl group-containing components is in a prescribed range.

BACKGROUND ART

An organic polymer containing at least one reactive silyl group per molecule is known to have a characteristic that it is cross-linked by siloxane bond formation involving hydrolysis or other reactions of the reactive silyl group due to factors such as moisture even at room temperature, whereby a rubbery cured product is obtained.

Among such reactive silyl group-containing organic polymers, those whose backbone skeleton is a polyoxyalkylene polymer, a saturated hydrocarbon polymer, or a poly(meth) acrylic acid ester copolymer are disclosed in, for example, Patent Literature 1, have already been produced industrially and are widely used in applications such as sealing materials, adhesives, coating materials and paints.

The market share of these organic polymers in building sealing material applications in particular has been increasing for at least 20 years. Detached housing that uses siding boards has become predominant in recent years, and sealing materials are also used in the joints between siding boards. However, since siding boards are porous boards, it has been found that the plasticizer tends to be slowly absorbed into the boards during long-term exposure, thereby reducing the elongation of the cured product. In order to allow the sealing material to have watertightness and airtightness even after long-term exposure, the initial cured product can be formed to have low modulus and high elongation so that a satisfactory performance can be achieved even when some plasticizer has escaped. In addition, the co-use with a low specific gravity, hollow resin has been employed recently in order to reduce the cost of the curable composition on a volume basis. However, it is becoming clear that the use of the hollow resin brings about the problems of reduced workability due to an increase in the viscosity of the curable composition and reduced elongation of the cured product, and therefore an improved technique is desired.

Some methods exist to allow the cured product of a curable composition containing a reactive silyl group-containing organic polymer to exhibit the physical properties of low modulus and high elongation. One of these methods is to increase the amount of plasticizer, but this is unsuitable because the weather resistance of the cured product is then reduced. Another method is that the number of silyl groups in each molecule of the reactive silyl group-containing organic polymer is reduced; however, this method is unfavorable because it causes the stickiness of the surface of the cured product (referred to below as the residual tack) to get worse. Still another method exists in which the molecular weight of the organic polymer is increased while keeping the number of silyl groups in each molecule constant; however, this raises the viscosity of the organic polymer and the associated increase in the viscosity of the curable composition causes the problem of poor workability.

Meanwhile, techniques that use a combination of at least two organic polymers containing different amounts of reactive silyl groups are already known from Patent Literatures 2 to 9 and the like; however, these involve only simple mixing at a certain weight ratio and have not considered the nature of each component in the mixture. In addition, these use an organic polymer having a branched structure and/or use a trialkoxysilyl group as the reactive silyl group, and there is thus room for improvement with regard to the achievement of low modulus and high elongation.

CITATION LIST

Patent Literature

Patent Literature 1: Japanese Patent No. 2,708,833
Patent Literature 2: Japanese Patent No. 2,687,038
Patent Literature 3: JP-A H09-095609
Patent Literature 4: Japanese Patent No. 3,155,035
Patent Literature 5: Japanese Patent No. 3,575,132
Patent Literature 6: JP-A 2005-240049
Patent Literature 7: JP-A 2007-204634
Patent Literature 8: WO 2005/073322
Patent Literature 9: JP-A 2005-213446

SUMMARY OF INVENTION

Technical Problem

An object of the present invention is to provide a curable composition that can be used mainly for building sealing materials and that, even though it has a low viscosity, yields a low modulus, high elongation cured product.

Solution to Problem

As a result of intensive investigations in order to solve the problem identified above, the present inventors have found that it is effective to use an optimal amount of an organic polymer that contains only one reactive silyl group per molecule. In particular, the present inventors have found that the ratio of the number of moles (y) of constituents having only one reactive silyl group per molecule to the number of moles (x) of constituents having at least 2 reactive silyl groups per molecule is important, and thus have found out its optimal range for use in building sealing materials. The present invention has been completed based on these findings.

Specifically, the present invention relates to:

(I). a curable composition, including:

an organic polymer (A) containing on average at least 1.4 reactive silyl groups per molecule; and an organic polymer (B) containing on average less than 1 reactive silyl group per molecule, wherein the number average molecular weight of component (B) is lower than the number average molecular weight of component (A) by at least 3,000, and the ratio (y)/(x) of the number of moles (y) of organic polymers containing only one reactive silyl group per molecule among components (A) and (B) to the number of moles (x) of organic polymers containing at least 2 reactive silyl groups per molecule among components (A) and (B) is not more than 5;

(II). the curable composition according to (I),
wherein the number average molecular weight of component (B) is at least 2,000;

(III). the curable composition according to (I) or (II),
wherein the organic polymer (A) has a linear structure;

(IV). the curable composition according to any one of (I) to (III),
wherein the backbones of components (A) and (B) are each at least one selected from a polyoxyalkylene polymer, a poly(meth)acrylic polymer and a hydrocarbon polymer;

(V). the curable composition according to any one of (I) to (IV),
wherein the backbones of components (A) and (B) are each a polyoxyalkylene polymer;

(VI). the curable composition according to any one of (I) to (V),
wherein the backbones of components (A) and (B) are each a polyoxypropylene polymer;

(VII). the curable composition according to any one of (I) to (VI),
wherein component (B) is obtained by introduction of a reactive silyl group into a polyoxypropylene polymer obtained by reaction of propylene oxide using an initiator having only one hydroxy group per molecule in the presence of a double metal cyanide complex catalyst;

(VIII). the curable composition according to any one of (I) to (VII),
wherein components (A) and (B) are obtained together by introduction of a reactive silyl group into polyoxypropylene polymers obtained by reaction of propylene oxide using an initiator having at least 2 hydroxy groups per molecule in combination with an initiator having only one hydroxy group per molecule in the presence of a double metal cyanide complex catalyst;

(IX). the curable composition according to any one of (I) to (VIII),
wherein the reactive silyl groups in components (A) and (B) are both methyldimethoxysilyl groups;

(X). the curable composition according to anyone of (I) to (IX),
which includes an organotin curing catalyst (C);

(XI). a building sealing material, including the curable composition according to any one of (I) to (X); and (XII). a siding board sealing material, including the curable composition according to any one of (I) to (X).

Advantageous Effects of Invention

The present invention relates to a curable composition which combines at least two organic polymers that differ in both the molecular weight and the reactive silyl group content and which is designed so that the ratio of the number of moles of constituents each having only one silyl group thereamong to the number of moles of constituents each having at least 2 silyl groups thereamong is in a prescribed range. Thus the present invention can provide a curable composition that has a low viscosity, low modulus and high elongation and is suited for building sealing materials.

DESCRIPTION OF EMBODIMENTS

Hereinafter, the present invention will be described in detail.

The backbone skeletons of the reactive silyl group-containing organic polymer (A) and organic polymer (B) used in the present invention are not particularly limited and organic polymers having various backbone skeletons can be used.

The backbone skeletons each preferably contain at least one selected from a hydrogen atom, carbon atom, nitrogen atom, oxygen atom, and sulfur atom because this provides excellent curability and adhesiveness to the resulting composition.

Specific examples thereof include polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers such as ethylene-propylene copolymers, polyisobutylene, copolymers of isobutylene and isoprene or like monomers, polychloroprene, polyisoprene, copolymers of isoprene or butadiene with acrylonitrile and/or styrene or like monomers, polybutadiene, and copolymers of isoprene or butadiene with acrylonitrile and styrene or like monomers, and hydrogenated polyolefin polymers derived from hydrogenation of these polyolefin polymers; polyester polymers obtained by condensation of a dibasic acid such as adipic acid and a glycol, and obtained by ring-opening polymerization of lactones; (meth)acrylic acid ester polymers obtained by radical polymerization of monomers such as ethyl (meth)acrylate and butyl (meth)acrylate; vinyl polymers obtained by radical polymerization of monomers such as (meth)acrylic acid ester monomers, vinyl acetate, acrylonitrile and styrene; graft polymers obtained by polymerizing vinyl monomers in aforementioned organic polymers; polysulfide polymers; polyamide polymers such as nylon 6 produced by ring-opening polymerization of ε-caprolactam, nylon 6/6 produced by polycondensation of hexamethylenediamine and adipic acid, nylon 6/10 produced by polycondensation of hexamethylenediamine and sebacic acid, nylon 11 produced by polycondensation of s-aminoundecanoic acid, nylon 12 produced by ring-opening polymerization of ε-aminolaurolactam, and copolymer nylons derived from at least two species of the aforementioned nylons; polycarbonate polymers prepared by, for example, polycondensation of bisphenol A and carbonyl chloride, and diallyl phthalate polymers.

Preferred among these are saturated hydrocarbon polymers such as polyisobutylene, hydrogenated polyisoprene and hydrogenated polybutadiene; polyoxyalkylene polymers; and (meth)acrylic acid ester polymers. This is because these polymers have a relatively low glass transition temperature and give cured products that are excellent in cold resistance.

The glass transition temperatures of the organic polymers (A) and (B) are not particularly limited, and are each preferably 20° C. or lower, more preferably 0° C. or lower, and particularly preferably −20° C. or lower. A glass transition temperature of higher than 20° C. may lead to the composition having a high viscosity in winter or in cold districts and therefore poor workability, and may also result in the cured product with lower flexibility and therefore lower elongation properties. The glass transition temperature values are measured by DSC.

Polyoxyalkylene polymers and (meth)acrylic acid ester polymers are particularly preferred because they are high in moisture permeability, and are excellent in the depth curability when used for one-pack compositions, and in adhesion. Here, polyoxyalkylene polymers are most preferred. Polyoxypropylene polymers are particularly preferred among the polyoxyalkylene polymers.

The reactive silyl group present in the organic polymer in the present invention is a group that contains a hydroxy or hydrolyzable group bonded to a silicon atom and can undergo crosslinking through the formation of a siloxane bond by a reaction accelerated by a silanol condensation catalyst. The reactive silyl group may be a group represented by formula (1):

(1)

wherein each $R^1$ is independently a C1 to C20 alkyl group, a C6 to C20 aryl group, a C7 to C20 aralkyl group, or a triorganosiloxy group represented by —OSi(R')$_3$ where each R' is independently a C1 to C20 hydrocarbon group; each X is independently a hydroxy group or a hydrolyzable group; and a is an integer of 1 to 3.

The hydrolyzable group is not particularly limited, and may be any conventionally known hydrolyzable group. Specific examples thereof include a hydrogen atom, a halogen atom, an alkoxy group, an acyloxy group, a ketoxymate group, an amino group, an amido group, an acid amido group, an aminooxy group, a mercapto group, and an alkenyloxy group. Preferred among these are a hydrogen atom, an alkoxy group, an acyloxy group, a ketoxymate group, an amino group, an amido group, an aminooxy group, a mercapto group, and an alkenyloxy group. Particularly preferred is an alkoxy group, in terms of mild hydrolysis and easy workability.

From 1 to 3 hydrolyzable or hydroxy groups can be bonded to a single silicon atom. When two or more hydrolyzable or hydroxy groups are bonded in the reactive silyl group, these groups may be the same as or different from one another.

The value of a in formula (1) is preferably 2 or 3 from the standpoint of curability, and in particular is preferably 3 when rapid curability is required or is preferably 2 when storage stability is required.

Specific examples of $R^1$ in formula (1) include alkyl groups such as a methyl group and an ethyl group; cycloalkyl groups such as a cyclohexyl group; aryl groups such as a phenyl group; aralkyl groups such as a benzyl group; triorganosiloxy groups represented by —OSi(R')$_3$ with R's each being a group such as a methyl group and a phenyl group; a chloromethyl group, and a methoxymethyl group. Among these, a methyl group is particularly preferred.

More specific examples of the reactive silyl group include a trimethoxysilyl group, a triethoxysilyl group, a triisopropoxysilyl group, a dimethoxymethylsilyl group, a diethoxymethylsilyl group, and a diisopropoxymethylsilyl group. Preferred are a trimethoxysilyl group, a triethoxysilyl group, and a dimethoxymethylsilyl group as they have high activity to achieve favorable curability. Particularly preferred is a dimethoxymethylsilyl group. Also, a dimethoxymethylsilyl group and a triethoxysilyl group are particularly preferred in terms of storage stability. In addition, a triethoxysilyl group and a diethoxymethylsilyl group are particularly preferred because they give ethanol as alcohol generated in connection with the hydrolysis reaction of the reactive silyl group, which means they have higher safety.

The reactive silyl group may be introduced by a conventionally known method. Specifically, some exemplary methods are mentioned below.

(I) An organic polymer containing a functional group such as a hydroxy group within the molecule is allowed to react with an organic compound containing an unsaturated group and an active group that is reactive with the functional group to provide an unsaturated group-containing organic polymer. Alternatively, the functional group-containing organic polymer is allowed to copolymerize with an unsaturated group-containing epoxy compound to provide an unsaturated group-containing organic polymer. Then, the reaction product is allowed to react with a reactive silyl group-containing hydrosilane for hydrosilylation.

(II) An unsaturated group-containing organic polymer obtained in the same manner as in the method (I) is allowed to react with a compound containing a mercapto group and a reactive silyl group.

(III) An organic polymer containing a functional group such as a hydroxy group, an epoxy group or an isocyanato group within the molecule is allowed to react with a compound containing a reactive silyl group and a functional group that is reactive with the former functional group.

Preferred among these is the method (I), or the method (III) in such a mode that a hydroxy-terminated polymer is allowed to react with a compound containing an isocyanato group and a reactive silyl group because these methods achieve a high conversion rate in a relatively short reaction time. Moreover, particularly preferred is the method (I) because the curable composition containing the reactive silyl group-containing organic polymer produced by the method (I) has lower viscosity than that in the case of using the organic polymer produced by the method (III), and thus has better workability, and also because the organic polymer produced by the method (II) has a strong odor due to mercaptosilane.

Specific examples of the hydrosilane compound used in the method (I) include, but not limited to, halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane, phenyldimethoxysilane and 1-[2-(trimethoxysilyl)ethyl]-1,1,3,3-tetramethyldisiloxane; acyloxysilanes such as methyldiacetoxysilane and phenyldiacetoxysilane; and ketoxymatesilanes such as bis(dimethylketoxymate)methylsilane and bis(cyclohexylketoxymate)methylsilane. Among these, in particular, halogenated silanes and alkoxysilanes are preferred. Most preferred are, in particular, alkoxysilanes because curable compositions to be provided therefrom are mildly hydrolyzed and are easy to handle. Preferred among the alkoxysilanes is methyldimethoxysilane because it is easily available and provides high curability, storage stability, elongation properties and tensile strength to a curable composition containing the resulting organic polymer. In terms of the curability of the curable composition to be provided and the recovery, trimethoxysilane is particularly preferred.

The synthesis method (II) is not particularly limited, and examples thereof include a method of introducing a compound containing a mercapto group and a reactive silyl group into an unsaturated bond moiety of an organic polymer by radical addition reaction in the presence of a radical initiator and/or a radical generation source. Specific examples of the compound containing a mercapto group and a reactive silyl group include, but not limited to, γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethyltriethoxysilane.

The synthesis method (III) in which a hydroxy-terminated polymer is allowed to react with a compound containing an isocyanato group and a reactive silyl group is not particularly limited, and examples thereof include a method as disclosed in JP-A H03-47825. Specific examples of the compound containing an isocyanato group and a reactive silyl group include, but not limited to, γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, and isocyanatomethyldiethoxymethylsilane.

In the case of a silane compound in which three hydrolyzable groups are bonded to one silicon atom, such as trimethoxysilane, disproportionation may proceed. As the disproportionation proceeds, unstable compounds such as dimethoxysilane may be generated, thereby making it difficult to handle. In the case of γ-mercaptopropyltrimethoxysilane or γ-isocyanatopropyltrimethoxysilane, however, such disproportionation will not proceed. Thus, the synthesis method (II) or (III) is preferred in the case that a group in which three hydrolyzable groups are bonded to one silicon atom, such as a trimethoxysilyl group, is used as the silyl group.

On the other hand, disproportionation will not proceed in the case of a silane compound represented by formula (2):

$$H—(SiR^2{}_2O)_m SiR^2{}_2—R^3—SiX_3 \qquad (2)$$

wherein X is defined as mentioned above; (2 m+2) $R^2$s each independently are a hydrocarbon group, and each are preferably a C1 to C20 hydrocarbon group, more preferably a C1 to C8 hydrocarbon group, and particularly preferably a C1 to C4 hydrocarbon group, in terms of availability and cost; $R^3$ is a divalent organic group, and is preferably a C1 to C12 divalent hydrocarbon group, more preferably a C2 to C8 divalent hydrocarbon group, and particularly preferably a C2 divalent hydrocarbon group, in terms of availability and cost; and m is an integer of 0 to 19, and is preferably 1 in terms of availability and cost. For this reason, the silane compound represented by formula (2) is preferably used in the case of introducing a group in which three hydrolyzable groups are bonded to one silicon atom by the synthesis method (I). Specific examples of the silane compound represented by formula (2) include 1-[2-(trimethoxysilyl)ethyl]-1,1,3,3-tetramethyldisiloxane, 1-[2-(trimethoxysilyl)propyl]-1,1,3,3-tetramethyldisiloxane, and 1-[2-(trimethoxysilyl)hexyl]-1,1,3,3-tetramethyldisiloxane.

The reactive silyl group-containing organic polymer (A) and organic polymer (B) may have a linear or branched structure, and each desirably have a linear structure because then the effects of the present invention can be better achieved. The number average molecular weight of component (A), expressed as the number average molecular weight determined based on the amount of hydroxy groups, is about 8,000 to 50,000, more preferably 9,000 to 30,000, and particularly preferably 10,000 to 25,000. When the number average molecular weight is less than 8,000, an undesirable trend appears with regard to the elongation properties of the cured product; when the number average molecular weight exceeds 50,000, an undesirable trend appears with regard to workability due to the resulting high viscosity. On the other hand, the number average molecular weight of component (B), measured as indicated above, is in the range of about 2,000 to 20,000, more preferably about 3,000 to 18,000, particularly preferably 4,000 to 16,000, even more preferably 5,000 to 15,000, and most preferably 8,000 to 14,000. In the present invention, the number average molecular weight of (B) must be lower than the number average molecular weight of component (A) by at least 3,000. This is because the effects of lowering the modulus and of reducing the viscosity are small when the molecular weight of component (B) is larger than that of component (A) or when there is little difference in their molecular weights.

In the present invention, in order to obtain a rubbery cured product that exhibits high strength, high elongation and low elastic modulus, the organic polymer (A) preferably contains on average from 1.4 to 5, most preferably 1.6, reactive silyl groups per molecule of the polymer. When the number of reactive silyl groups present in the molecule is less than 1.4 on average, the curability becomes inadequate, making it difficult to exhibit a good rubber elastic behavior. Conversely, when the number of reactive silyl groups is 5 or more on average, the cured product becomes hard, making it difficult to exhibit high elongation.

The organic polymer (B), on the other hand, contains on average less than 1 reactive silyl group per molecule of the polymer, preferably at least 0.6 but less than 1, with at least 0.7 being more preferred.

The number of branches in the backbone of the organic polymer (A) is preferably not more than 3, more preferably not more than 2, and further desirably not more than 1, and the absence of branching is most preferred. The absence of branching means that the backbone has a linear structure. The present invention aims to achieve the effects of low modulus and high elongation and from this standpoint, component (A) preferably has a linear structure.

In the present invention, the amount (parts) of component (B) to be used is greatly associated with its own molecular weight and thus depends on circumstances. In the case of component (B) with a large molecular weight, since component (B) has a high viscosity with a relatively small number of moles thereof, a larger amount of component (B) should be used. In the case of component (B) with a small molecular weight, on the other hand, since component (B) has a low viscosity with a relatively large number of moles thereof, a smaller amount of component (B) is suitably used. Based on these considerations, the amount (parts) of component (B) to be used is mentioned. Based on 100 parts by weight in total of components (A) and (B), component (B) is preferably present in an amount of 5 to 80 parts by weight, more preferably 10 to 70 parts by weight, and most preferably 15 to 60 parts by weight. With less than 5 parts by weight of component (B), the effects of lowering the modulus and of reducing the viscosity are inadequate. Conversely, more than 80 parts by weight of component (B) is unsuitable because the cured product then has insufficient strength or some composition is not completely cured.

The present invention relates to a curable composition in which the ratio of the number of moles (y) of organic polymers containing only one reactive silyl group per molecule among components (A) and (B) to the number of moles (x) of organic polymers containing at least 2 reactive silyl groups per molecule among components (A) and (B), i.e., the ratio (y)/(x), is not more than 5. This ratio (y)/(x) is a numerical value larger than 0 and less than or equal to 5. When it is larger than 5, the cured product has low strength and a good elastic body cannot be obtained. The ratio (y)/(x) is preferably not more than 4, more preferably not more than 3, and in particular is most preferably not more than 2.

With regard to the method for producing the organic polymer (B) containing on average less than 1 reactive silyl group per molecule, a method is unfavorable that involves reacting a small amount of a reactive silyl group-containing compound with a linear organic polymer having an unsaturated group at both terminals. The reason for this is that such a method results in the stochastic formation of 3 species, i.e., the linear organic polymer in which the silyl group has been introduced at both terminals thereof, the polymer in which the silyl group has been introduced at only one terminal, and the polymer into which the silyl group has not been introduced. The important component in the present invention is the polymer in which the silyl group has been introduced at only one terminal and which has a large effect in terms of modulus reduction and elongation increase. Thus, a synthetic method must be adopted for the organic polymer (B) in which the silyl group is introduced preferably at only one terminal.

Specifically, an organic polymer containing only one active hydrogen (e.g., hydroxy group) per molecule is preferably used as the organic polymer used in the preceding paragraph (I). With regard to the actual production of component (B), when an organic polymer containing only one active hydrogen per molecule is used as the initiator under conditions such that the charged amount is small and adequate stirring is not guaranteed, a compound containing at least 2 active hydrogens per molecule may be used in combination. In this case, an organic polymer containing on average 2 reactive silyl groups per molecule will coexist, but this is not a particular problem as long as the average number of reactive silyl groups in each molecule is adjusted to less than 1.

Examples of the initiator containing only one active hydrogen per molecule include, but not limited to, the following compounds: primary, secondary and tertiary monohydric alcohols such as methanol, ethanol, propanol, butanol, pentanol, hexanol, heptanol, octanol, nonanol and decanol; unsaturated group-containing monohydric alcohols such as allyl alcohol, methallyl alcohol, and propenyl alcohol; and unsaturated group-containing monohydric alcohols such as monoallyl-etherified or monovinyl-etherified products of the following substances as obtained by monoallyl or monovinyl etherification of the following: ethylene glycol, diethylene glycol, propylene glycol, dipropylene glycol, 1,3-propanediol, neopentyl glycol, 1,4-butanediol, 1,5-pentanediol, 1,6-hexanediol, 1,4-cyclohexanediol and the like, and saturated monohydric alcohols such as monoalkyl-etherified products of the foregoing substances as obtained by monoalkyl etherification of the substances. With regard to the type of active hydrogen group, alcohols are preferred from the standpoints of reactivity and availability, and in particular C3 to C7 alcohols are most preferred. C1 and C2 alcohols are unsuitable as the initiator because they have low boiling points and are difficult to be stable as liquids. On the other hand, alcohols having 8 or more carbons tend to lead to poor reactivity when the reactive silyl group is introduced into the resulting organic polymer. Among the alcohols, n-butanol is most preferred.

As described above, when a low molecular weight alcohol is used, some problems may arise during the actual production. In such cases, it is favorable to use a polyether polymer having a hydroxy group at only one terminal. Polymers having a molecular weight of about 1,000 to 5,000 can be used; for example, polyoxypropylene monobutyl ether (product name: NEWPOL) from SANYO CHEMICAL INDUSTRIES, LTD. can be suitably used.

When such an initiator is used for synthesis of the organic polymer, an organic polymer with a high content of constituents having one reactive silyl group per molecule can be obtained.

The reactive silyl group may reside at a terminal of the backbone of the molecular chains of the organic polymer or may reside at a terminal of a side chain or may reside at both positions. In particular, the reactive silyl group preferably resides only at a terminal of the backbone of the molecular chains because the finally formed cured product has an increased effective network size of the organic polymer component, which means that a rubbery cured product having high strength, high elongation and low elastic modulus can readily be obtained.

The present invention uses at least two species of reactive silyl group-containing organic polymers, and the molar ratio between constituents included therein is used in the present invention to govern the physical properties of the cured product. When the constituents constituting the reactive silyl group-containing organic polymer are considered in detail, they are a mixture of a constituent having at least 2 reactive silyl groups per molecule, a constituent having only one reactive silyl group per molecule, and a constituent having no reactive silyl group in the molecule. A curable composition containing a reactive silyl group-containing organic polymer is converted to a cured product through the reaction of the silyl group, for use in suitable applications, but it cannot always provide a good cured product when the aforementioned constituents are present in just any proportions. The constituent having at least 2 reactive silyl groups per molecule has an ideal structure for crosslink formation. On the other hand, the constituent having only one reactive silyl group per molecule has a structure such that it dangles from the crosslinking component and thus, when used in an optimal amount, provides the advantage of enabling a loosely cross-linked structure; however, when too much of this constituent is used, the crosslinking ends up being inadequate and thus the essentially desired physical properties cannot be developed. In addition, it has been found that this constituent having only one reactive silyl group per molecule exercises its influence through the number of molecules rather than through the weight. In other words, the same amount (parts by weight) of the constituent having only one reactive silyl group per molecule has a smaller effect on reduction of the physical properties if it has a large average molecular weight; conversely, with a small average molecular weight, that has a larger effect. The molecular weight mentioned here is not the average molecular weight determined relative to polystyrene standards by GPC measurement; but, in order to determine the molecular weight, a method is selected in which the number of molecular chain terminals is measured and which is thought to enable a more accurate understanding of the number of molecules. Specifically, the molecular weight is determined from the measurement of the concentration of terminal hydroxy groups after polymerization. Thus, with respect to the reactive silyl group-containing polymers, when the molar ratio of constituents each having only one reactive silyl group to constituents each having at least 2 reactive silyl groups is calculated, a good cured product can be provided only with a prescribed ratio.

In the present invention, two species of reactive silyl group-containing organic polymers are used in combination; instead, two initiators can be used in combination in the polymerization step, to readily obtain organic polymers including a mixture of constituents having different contents of reactive silyl group introduced. Specifically, polymerization is performed using as the initiator a mixture of a polypropylene glycol component and a compound containing only one hydroxy group per molecule, and then a reactive silyl group is introduced by a conventional method. A mixture of components (A) and (B) in the present invention can be obtained by optimizing the initiator.

The polyoxyalkylene polymers mentioned above are polymers that substantially have a repeating unit represented by formula (3):

wherein $R^4$ is a C1 to C14 linear or branched alkylene group), and the $R^4$ in formula (3) is preferably a C1 to C14, more preferably C2 to C4, linear or branched alkylene group. Specific examples of the repeating units represented by formula (3) include: $-CH_2O-$, $-CH_2CH_2O-$, $-CH_2CH(CH_3)O-$, $-CH_2CH(C_2H_5)O-$, $-CH_2C(CH_3)_2O-$, and $-CH_2CH_2CH_2CH_2O-$. The backbone skeleton of the polyoxyalkylene polymer may be composed of just one species of repeating unit or may be composed of two or more species of repeating units. Particularly for use in sealing materials and the like, the backbone skeleton is preferably formed of a polymer mainly including a propylene oxide polymer because it is noncrystalline and has a relatively low viscosity.

Examples of the method for synthesizing a polyoxyalkylene polymer include, but not limited to, a polymerization method using an alkali catalyst such as KOH; a polymerization method using a transition metal compound-porphyrin complex catalyst such as a complex obtained by reaction between an organoaluminum compound and a porphyrin, as disclosed in JP-A S61-215623; a polymerization method using a double metal cyanide complex catalyst, as disclosed in JP-B S46-27250 and JP-B S59-15336 and U.S. Pat. Nos. 3,278,457, 3,278,458, 3,278,459, 3,427,256, 3,427,334 and 3,427,335, and other documents; a polymerization method using a catalyst containing a polyphosphazene salt, as disclosed in JP-A H10-273512; and a polymerization method using a catalyst containing a phosphazene compound, as disclosed in JP-A H11-060722.

Examples of the method for producing a polyoxyalkylene polymer containing a reactive silyl group include, but not limited to, methods disclosed in JP-B S45-36319, JP-B S46-12154, JP-A S50-156599, JP-A S54-6096, JP-A S55-13767, JP-A S55-13468 and JP-A S57-164123, JP-B H03-2450, and U.S. Pat. Nos. 3,632,557, 4,345,053, 4,366,307, and 4,960,844, and other documents; and methods disclosed in JP-A S61-197631, JP-A S61-215622, JP-A S61-215623, JP-A S61-218632, JP-A H03-72527, JP-A H03-47825, and JP-A H08-231707, which can provide polyoxyalkylene polymers with a high molecular weight and a narrow molecular weight distribution, namely, with a number average molecular weight of 6,000 or higher and Mw/Mn of 1.6 or less.

Each of the reactive silyl group-containing polyoxyalkylene polymers may be used alone, or two or more of these may be used in combination.

The saturated hydrocarbon polymers mentioned above are polymers that are substantially free from any unsaturated carbon-carbon bonds except for aromatic rings. The polymers forming the skeletons of these polymers can be obtained, for example, by (1) polymerizing as a main monomer a C2 to C6 olefin compound such as ethylene, propylene, 1-butene or isobutylene, or by (2) homopolymerizing a diene compound such as butadiene or isoprene or copolymerizing such a diene compound with the olefin compound, and then hydrogenating the resulting product. Here, isobutylene polymers and hydrogenated polybutadiene polymers are preferred because they allow easy introduction of a functional group into their terminal, easy control of the molecular weight, and an increase in the number of terminal functional groups. Isobutylene polymers are particularly preferred.

Those whose backbone skeleton is a saturated hydrocarbon polymer are characteristically excellent in heat resistance, weather resistance, durability, and moisture barrier properties.

All the monomer units of the isobutylene polymer may be isobutylene units, or alternatively, the isobutylene polymer may be a copolymer with another monomer. In terms of the rubber properties, the polymer preferably has 50% by weight or more, more preferably 80% by weight or more, and particularly preferably 90 to 99% by weight, of repeating units derived from isobutylene.

Various polymerization methods have been conventionally proposed as the method for synthesizing a saturated hydrocarbon polymer. In particular, many methods of so-called living polymerization have been developed in recent years. The saturated hydrocarbon polymers, especially isobutylene polymers, can be easily produced by inifer polymerization found by Kennedy et al. (J. P. Kennedy et al., J. Polymer Sci., Polymer Chem. Ed., 1997, Vol. 15, p. 2843). This method is known to allow production of polymers having a molecular weight of about 500 to 100,000 with a molecular weight distribution of 1.5 or less and introduction of various functional groups into the molecular terminal.

Examples of the method for producing a saturated hydrocarbon polymer containing a reactive silyl group include, but not limited to, methods disclosed in JP-B H04-69659, JP-B H07-108928, JP-A, S63-254149, JP-A S64-22904, JP-A, H01-197509, Japanese Patent Nos. 2539445 and 2873395, and JP-A H07-53882.

Each of the reactive silyl group-containing saturated hydrocarbon polymers may be used alone, or two or more of these may be used in combination.

The (meth)acrylic acid ester monomers forming the backbones of the (meth)acrylic acid ester polymers mentioned above are not particularly limited and various monomers may be used. Examples thereof include (meth)acrylate monomers such as (meth)acrylic acid, methyl(meth)acrylate, ethyl (meth)acrylate, n-propyl(meth)acrylate, isopropyl(meth) acrylate, n-butyl(meth)acrylate, isobutyl(meth)acrylate, tert-butyl(meth)acrylate, n-pentyl(meth)acrylate, n-hexyl(meth) acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, toluoyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl (meth)acrylate, 2-aminoethyl(meth)acrylate, γ-(methacryloyloxy)propyltrimethoxysilane, γ-(methacryloyloxy)propyldimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, and (meth)acrylic acid-ethylene oxide adducts.

The (meth)acrylic acid ester polymers include copolymers of such a (meth)acrylic acid ester monomer and a vinyl monomer as mentioned below. Examples of the vinyl monomer include: styrene monomers such as styrene, vinyltoluene, α-methylstyrene, chlorostyrene, and styrenesulfonic acid and salts thereof; silicon-containing vinyl monomers such as vinyltrimethoxysilane and vinyltriethoxysilane; maleic anhydride, maleic acid, and monoalkyl or dialkyl esters of maleic acid; fumaric acid, and monoalkyl or dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol.

Each of these may be used alone, or a plurality of these may be copolymerized. Among these, in terms of the physical properties of the resulting product, preferred are polymers derived from a styrene monomer or a (meth)acrylate monomer, more preferred are (meth)acrylic polymers derived from an acrylic acid ester monomer or a methacrylic acid ester monomer, and particularly preferred are acrylic polymers derived from an acrylic acid ester monomer. In general building applications and the like where the composition is required to have low viscosity and the cured product thereof is required to have physical properties such as low modulus, high elongation, weather resistance, and heat resistance, butyl acrylate monomer is more preferably used. Meanwhile, in applications that require properties including oil resistance, such as automotive applications, a copolymer mainly derived from ethyl acrylate is more preferably used. The polymer mainly derived from ethyl acrylate is likely to be slightly poor in low-temperature properties (cold resistance) though having excellent oil resistance. In order to improve these low-temperature properties, some ethyl acrylate monomers may be replaced with butyl acrylate monomers. As the proportion of butyl acrylate increases, however, the good oil resistance is likely to be impaired. Hence, in applications requiring oil resistance, the proportion of the monomer is preferably 40% or lower, and more preferably 30% or lower. In order to improve the properties such as low-temperature properties without impairing the oil resistance, it is also preferable to use a monomer in which an oxygen atom has been introduced into a side-chain alkyl group, such as 2-methoxyethyl acrylate and 2-ethoxyethyl acrylate. Here, the introduction of an alkoxy group having an ether bond at a side chain is likely to cause poor heat resistance. Hence, the proportion of the monomer is preferably 40% or lower in the case where heat resistance is required for use. Thus, suitable polymers can be obtained by adjusting the monomer proportion in consideration of required physical properties such as oil resistance, heat resistance, and low-temperature properties, according to particular uses and requirements. For example, without any limitative meaning, mention may be made of copolymers of ethyl acrylate, butyl acrylate, and 2-methoxyethyl acrylate (weight ratio: 40-50/20-30/30-20) which have an excellent balance between physical properties including oil resistance, heat resistance and low-temperature properties. In the present invention, such a preferred monomer may be copolymerized, or even block-copolymerized with another monomer. In this case, such a preferred monomer is preferably contained at 40% by weight or more. It should be noted that the term "(meth)acrylic acid", for example, as used herein refers to "acrylic acid and/or methacrylic acid".

The (meth)acrylic acid ester polymers can be synthesized by any methods such as conventionally known methods. However, ordinary free radical polymerization, in which a compound such as an azo compound or a peroxide is used as the polymerization initiator, is disadvantageously likely to provide a polymer having a molecular weight distribution value typically as large as 2 or greater and having high viscosity. Hence, living radical polymerization is preferred in order to produce a (meth)acrylic acid ester polymer having a narrow molecular weight distribution and low viscosity, and also having a cross-linkable functional group at a molecular chain terminal at a high ratio.

A more preferred method for producing a (meth)acrylic acid ester polymer containing a specific functional group is "atom transfer radical polymerization", in which (meth) acrylic acid ester monomers are polymerized using an initiator such as an organic halide or a sulfonyl halide compound in the presence of a transition metal complex catalyst, among the "living radical polymerization" methods. This is because the atom transfer radical polymerization provides a polymer terminated with a halogen or a like group which is relatively advantageous to functional-group exchange reactions, and gives a high degree of freedom in terms of the design of the initiator and the catalyst, as well as having the characteristics of the "living radical polymerization". Examples of the atom transfer radical polymerization include a method described in Matyjaszewski et al., Journal of the American Chemical Society (J. Am. Chem. Soc.), 1995, vol. 117, p. 5614.

Examples of the method for producing a reactive silyl group-containing (meth)acrylic acid ester polymer include, but not limited to, a method that involves free radical polymerization with a chain transfer agent, as disclosed in JP-B H03-14068, JP-B H04-55444, JP-A H06-211922, and other documents; and a method that involves atom transfer radical polymerization, as disclosed in JP-A H09-272714 and other documents. One species of the reactive silyl group-containing (meth)acrylic acid ester polymers may be used alone, or two or more species thereof may be used in combination.

Each of the reactive silyl group-containing organic polymers mentioned above may be used alone, or two or more of these may be used in combination. Specifically, organic polymers prepared as blends of two or more polymers selected from the group consisting of reactive silyl group-containing polyoxyalkylene polymers, reactive silyl group-containing saturated hydrocarbon polymers, and reactive silyl group-containing (meth)acrylic acid ester polymers may be used.

Examples of the method for producing the organic polymer as a blend of a reactive silyl group-containing polyoxyalkylene polymer and a reactive silyl group-containing (meth) acrylic acid ester polymer include, but not limited to, those proposed in JP-A S59-122541, JP-A S63-112642, JP-A H06-172631, JP-A H11-116763, and other documents. A preferred exemplary specific method includes blending a reactive silyl group-containing polyoxyalkylene polymer with a copolymer which contains a reactive silyl group and whose molecular chains substantially have a (meth)acrylic acid ester monomer unit containing a C1 to C8 alkyl group represented by formula (4):

$$-CH_2-C(R^5)(COOR^6)- \quad (4)$$

wherein $R^5$ is a hydrogen atom or a methyl group, and $R^6$ is a C1 to C8 alkyl group) and a (meth)acrylic acid ester monomer unit containing a C9 or higher alkyl group represented by formula (5):

$$-CH_2-C(R^5)(COOR^7)- \quad (5)$$

wherein $R^5$ is defined as mentioned above, and $R^7$ is a C9 or higher alkyl group.

Examples of $R^6$ in formula (4) include C1 to C8, preferably C1 to C4, and more preferably C1 or C2 alkyl groups such as a methyl group, an ethyl group, a propyl group, an n-butyl group, a t-butyl group, and a 2-ethylhexyl group. For $R^6$s, a single alkyl group may be used alone, or two or more alkyl groups may be used in admixture.

Examples of $R^7$ in formula (5) include long-chain alkyl groups having 9 or more carbon atoms, typically 10 to 30 carbon atoms, preferably 10 to 20 carbon atoms, such as a nonyl group, a decyl group, a lauryl group, a tridecyl group, a cetyl group, a stearyl group, and a behenyl group. For $R^7$s, a single alkyl group may be used alone, or two or more alkyl groups may be used in admixture as in the case of $R^6$.

The molecular chains of the (meth)acrylic acid ester polymer substantially has the monomer units of formulas (4) and (5). The term "substantially" herein means that the total amount of the monomer units of formulas (4) and (5) in the copolymer is more than 50% by weight. The total amount of the monomer units of formulas (4) and (5) is preferably 70% by weight or more.

The ratio between the monomer units of formulas (4) and (5) is preferably 95:5 to 40:60, and more preferably 90:10 to 60:40 by weight ratio.

Examples of monomer units that may be contained in the copolymer, other than the ones of formulas (4) and (5), include monomer units derived from acrylic acids such as acrylic acid and methacrylic acid; amide group-containing monomers such as acrylamide, methacrylamide, N-methylolacrylamide, and N-methylolmethacrylamide; epoxy group-containing monomers such as glycidyl acrylate and glycidyl methacrylate; amino group-containing monomers such as diethylaminoethyl acrylate, diethylaminoethyl methacrylate, and aminoethyl vinyl ether; and other monomers such as acrylonitrile, styrene, α-methylstyrene, alkyl vinyl ethers, vinyl chloride, vinyl acetate, vinyl propionate, and ethylene.

Some examples of the organic polymer prepared as a blend of a reactive silyl group-containing saturated hydrocarbon polymer and a reactive silyl group-containing (meth)acrylic acid ester polymer are disclosed, for example, in JP-A H01-168764 and JP-A 2000-186176, and the organic polymer is not particularly limited thereto.

Moreover, the organic polymers prepared as blends with a reactive silyl group-containing (meth)acrylic acid ester polymer may also be produced by polymerization of a (meth) acrylic acid ester monomer in the presence of a reactive silyl group-containing organic polymer. Such production methods are specifically disclosed in, for example, but not limited to, JP-A S59-78223, JP-A S59-168014, JP-A S60-228516, and JP-A S60-228517.

Meanwhile, the organic polymer may contain other components such as a urethane bond-containing component in the backbone skeleton, as long as they will not greatly impair the effects of the present invention.

The urethane bond-containing component is not particularly limited, and examples thereof include groups formed by reaction between an isocyanato group and an active hydrogen group (hereinafter, also referred to as amide segments).

The amide segments are groups represented by formula (6):

$$—NR^8—C(=O)— \qquad (6)$$

wherein $R^8$ represents an organic group or a hydrogen atom.

Specific examples of the amide segments include a urethane group formed by reaction between an isocyanate group and a hydroxy group; a urea group formed by reaction between an isocyanate group and an amino group; and a thiourethane group formed by reaction between an isocyanate group and a mercapto group. In the present invention, the groups of formula (6) also include groups formed by reaction of active hydrogen in the urethane group, urea group, or thiourethane group with an isocyanate group.

Examples of industrially convenient methods for the production of organic polymers containing an amide segment and a reactive silyl group include a production method including reacting an organic polymer terminated with an active hydrogen-containing group with an excessive amount of a polyisocyanate compound to give a polymer having an isocyanate group at a terminal of the polyurethane backbone, and thereafter, or simultaneously, reacting all or a part of the isocyanate groups with the group W of a silicon compound represented by formula (7):

$$W—R^9—SiR^1{}_{3-a}X_a \qquad (7)$$

wherein $R^1$, X and a are defined as mentioned above; $R^9$ is a divalent organic group, more preferably a C1 to C20 hydrocarbon group; W is an active hydrogen-containing group selected from a hydroxy group, a carboxy group, a mercapto group, and a (primary or secondary) amino group. Known production methods of organic polymers in connection with this production method include ones disclosed in JP-B S46-12154 (U.S. Pat. No. 3,632,557), JP-A S58-109529 (U.S. Pat. No. 4,374,237), JP-A S62-13430 (U.S. Pat. No. 4,645,816), JP-AH08-53528 (EP 0676403), JP-A H10-204144 (EP 0831108), JP-T 2003-508561 (U.S. Pat. No. 6,197,912), JP-A H06-211879 (U.S. Pat. No. 5,364,955), JP-A H10-53637 (U.S. Pat. No. 5,756,751), JP-A H11-100427, JP-A 2000-169544, JP-A 2000-169545, JP-A 2002-212415, Japanese Patent No. 3313360, U.S. Pat. Nos. 4,067,844, and 3,711,445, and JP-A 2001-323040.

Mention also may be made of organic polymers produced by reacting an organic polymer terminated with an active hydrogen-containing group with a reactive silyl group-containing isocyanate compound represented by formula (8):

$$O=C=N—R^9—SiR^1{}_{3-a}X_a \qquad (8)$$

wherein $R^9$, $R^1$, X and a are defined as mentioned above. Known production methods of organic polymers in connection with this production method include ones disclosed in JP-A H11-279249 (U.S. Pat. No. 5,990,257), JP-A2000-119365 (U.S. Pat. No. 6,046,270), JP-A S58-29818 (U.S. Pat. No. 4,345,053), JP-A H03-47825 (U.S. Pat. No. 5,068,304), JP-A H11-60724, JP-A 2002-155145, JP-A 2002-249538, WO 03/018658, and WO 03/059981.

Examples of the organic polymer terminated with an active hydrogen-containing group include hydroxy group-terminated oxyalkylene polymers (polyether polyols), polyacrylic polyols, polyester polyols, hydroxy group-terminated saturated hydrocarbon polymers (polyolefin polyols), polythiol compounds, and polyamine compounds. Among these, polyether polyols, polyacrylic polyols, and polyolefin polyols are preferred because they can provide organic polymers having a relatively low glass transition temperature and the cured products thereof are excellent in cold resistance. Especially, polyether polyols are particularly preferred as they can provide organic polymers having good depth curability and adhesiveness and also having a low viscosity to give favorable workability. Polyacrylic polyols and saturated hydrocarbon polymers mentioned above are also more preferred because they can provide organic polymers affording cured products with good weather resistance and heat resistance.

As the polyether polyol, polyether polyols produced by any production methods may be used, and the polyether polyol is preferably terminated with at least 0.7 hydroxy groups per molecular terminal as an average of all the molecules. Specific examples thereof include oxyalkylene polymers produced with use of a conventional alkali metal catalyst, and oxyalkylene polymers produced by reacting an alkylene oxide using an initiator having at least two hydroxy groups, such as a polyhydroxy compound, in the presence of a double metal cyanide complex or cesium.

Among the polymerization methods mentioned above, polymerization methods using a double metal cyanide complex are preferred because they allow production of oxyalkylene polymers having a lower degree of unsaturation, narrow Mw/Mn, lower viscosity, high acid resistance, and high weather resistance.

Examples of the polyacrylic polyols include polyols whose skeleton is an alkyl (meth)acrylate (co)polymer and which contain a hydroxy group inside the molecule. These polymers are preferably synthesized by living radical polymerization, and more preferably by atom transfer radical polymerization, because these methods allow production of polymers having a narrow molecular weight distribution and a low viscosity. In addition, the use is preferred of a polymer obtained by the continuous bulk polymerization of an alkyl acrylate monomer at high temperature and high pressure, that is, by the SGO process, as described in JP-A 2001-207157. Specific examples include ARUFON UH-2000 from Toagosei Co., Ltd.

Specific examples of the polyisocyanate compound mentioned above include aromatic polyisocyanates such as toluene (tolylene)diisocyanate, diphenylmethane diisocyanate, and xylylene diisocyanate; and aliphatic polyisocyanates such as isophorone diisocyanate and hexamethylene diisocyanate.

The above silicon compound of formula (7) is not particularly limited, and specific examples thereof include amino group-containing silanes such as γ-aminopropyltrimethoxysilane, N-(β-aminoethyl)-γ-aminopropyltrimethoxysilane, (N-phenyl)-γ-aminopropyltrimethoxysilane, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxy group-containing silanes such as γ-hydroxypropyltrimethoxysilane; and mercapto group-containing silanes such as γ-mercaptopropyltrimethoxysilane. Also usable as the silicon compound of formula (7) are Michael addition products prepared from various α,β-unsaturated carbonyl compounds and primary amino group-containing silanes, and Michael addition products prepared from various (meth)acryloyl group-containing silanes and primary amino group-containing compounds, as disclosed in JP-A H06-211879 (U.S. Pat. No. 5,364,955), JP-A H10-53637 (U.S. Pat. No. 5,756,751), JP-A H10-204144 (EP 0831108), JP-A 2000-169544, and JP-A 2000-169545.

The above reactive silyl group-containing isocyanate compound of formula (8) is not particularly limited, and specific examples thereof include γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate, and diethoxymethylsilylmethyl isocyanate. Also usable as the reactive silyl group-containing isocyanate compound of formula (8) are compounds obtained by reacting the silicon compound of formula (7) with an excessive amount of the polyisocyanate compound mentioned above, as disclosed in JP-A 2000-119365 (U.S. Pat. No. 6,046,270).

The organic polymers obtained by the above-described methods contain a group represented by formula (9) in the backbone skeleton:

$$—NR^{10}—C(=O)— \quad (9)$$

wherein $R^{10}$ represents a hydrogen atom or a substituted or unsubstituted organic group. Since this structure has a relatively high polarity, there is then a desirable tendency to increase the strength of the cured product and its adhesion to substrates.

An organotin curing catalyst (C) is used as the silanol condensation catalyst in the present invention. Specific examples of component (C) include, but not limited to, tetravalent organotin compounds such as dimethyltin diacetate, dimethyltin bis(acetylacetonate), dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltinbis(octylmaleate), dibutyltin bis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonylphenoxide), dibutenyltin oxide, dibutyltin oxide, dibutyltin bis(acetylacetonate), dibutyltin bis(ethyl acetoacetonate), reaction products of dibutyltin oxide and a silicate compound, reaction products of dibutyltin oxide and a phthalic acid ester, dioctyltin dilaurate, dioctyltin diacetate, and dioctyltin bis(acetylacetonate).

Curing catalysts other than the organotin systems listed above may also be used. Specific examples thereof include titanium compounds such as tetrabutyl titanate, tetrapropyl titanate, titanium tetrakis(acetylacetonate), bis(acetylacetonate)diisopropoxytitanium, and diisopropoxytitanium bis (ethyl acetoacetate); organoaluminum compounds such as aluminum tris(acetylacetonate), aluminum tris(ethyl acetoacetate), and diisopropoxyaluminum ethyl acetoacetate; and zirconium compounds such as zirconium tetrakis(acetylacetonate). Carboxylic acids and/or metal salts of carboxylic acids can also be used as the curing catalyst. In addition, amidine compounds as described in WO 2008/078654 can also be used. Examples of the amidine compounds include, but not limited to, 1-(o-tolyl)biguanide, 1-phenylguanidine, 1,2-dimethyl-1,4,5,6-tetrahydropyrimidine, 1,5,7-triazabicyclo[4.4.0]dec-5-ene, and 7-methyl-1,5,7-triazabicyclo [4.4.0]dec-5-ene.

The amount of the curing catalyst to be used, for each 100 parts by weight in total of components (A) and (B), is 0.1 to 20 parts by weight, preferably 0.2 to 10 parts by weight, and more preferably 0.3 to 5 parts by weight. With less than 0.1 parts by weight, proper curability does not develop. With more than 20 parts by weight, curing is too fast to form a proper cured product, and the desired performance properties cannot be satisfactorily achieved.

A plasticizer may also be used in the present invention. Examples of the plasticizer include esters of nonaromatic dibasic acids, e.g., dioctyl adipate, dioctyl sebacate, dibutyl sebacate, and diisodecyl succinate; aliphatic esters such as butyl oleate and methyl acetylricinoleate; phosphoric acid esters such as tricresyl phosphate and tributyl phosphate; esters of trimellitic acid; chlorinated paraffins; hydrocarbon oils such as alkylbiphenyls and partially hydrogenated terphenyls; process oils; and epoxy plasticizers such as epoxidized soybean oil and benzyl epoxystearate.

Also usable are phthalic acid esters such as dimethyl phthalate, diethyl phthalate, dibutyl phthalate, diisobutyl phthalate, di-normal-hexyl phthalate, bis(2-ethylhexyl) phthalate, di-normal-octyl phthalate, diisononyl phthalate, dinonyl phthalate, diisodecyl phthalate, diisoundecyl phthalate, and bisbutylbenzyl phthalate; however, considering their effects on the human body and the environment, it is preferable that they be used in small amounts or not used at all. Moreover, cyclohexanedicarboxylates prepared by hydrogenation of these phthalic acid esters can be used without raising safety concerns. Such a plasticizer is marketed and easily available under the product name Hexamoll DINCH from BASF.

Also, polymer plasticizers may be used. When a polymer plasticizer is used, the initial physical properties can be maintained for a long period of time compared with when a low-molecular-weight plasticizer is used which is a plasticizer containing no polymer moiety in the molecule. The drying properties (also referred to as coating properties) of an alkyd coating material applied to the cured product can also be improved. Specific examples of the polymer plasticizers include, but not limited to, vinyl polymers obtained by polymerizing vinyl monomers by various methods; esters of polyalkylene glycols, such as diethylene glycol dibenzoate, triethylene glycol dibenzoate, and pentaerythritol esters; polyester plasticizers prepared from dibasic acids (e.g., sebacic acid, adipic acid, azelaic acid, phthalic acid) and divalent alcohols (e.g., ethylene glycol, diethylene glycol, triethylene glycol, propylene glycol, dipropylene glycol); polyethers such as polyether polyols (e.g., polyethylene glycol, polypropylene glycol, and polytetramethylene glycol) which have a molecular weight of 500 or higher, or even a molecular weight of 1000 or higher, and derivatives thereof obtained by converting the hydroxy groups of these polyether polyols into ester groups, ether groups or other groups; polystyrenes such as polystyrene and poly-α-methylstyrene; polybutadiene, polybutene, polyisobutylene, polybutadiene-acrylonitrile, and polychloroprene.

Among these polymer plasticizers, those which are compatible with the polymers (A) and (B) are preferred. In this respect, polyethers and vinyl polymers are preferred. Use of a polyether as the plasticizer is preferred because the surface curability and depth curability are then improved and curing retardation will not occur after storage. Especially, polypropylene glycol is more preferred. In terms of compatibility, weather resistance and heat resistance, vinyl polymers are preferred. Among vinyl polymers, acrylic polymers and/or methacrylic polymers are preferred, and acrylic polymers such as polyalkyl acrylates are more preferred. The polymers may preferably be synthesized by living radical polymerization, more preferably atom transfer radical polymerization, because these methods allow production of polymers having a narrow molecular weight distribution and low viscosity. Also preferred are polymers obtained by the continuous bulk polymerization of an alkyl acrylate monomer at high temperature and high pressure, that is, by the SGO process, as described in JP-A 2001-207157. Such a plasticizer is marketed under the product name ARUFON from Toagosei Co., Ltd.

The polymer plasticizer preferably has a number average molecular weight of 500 to 15,000, more preferably 800 to 10,000, still more preferably 1,000 to 8,000, particularly preferably 1,000 to 5,000, and most preferably 1,000 to 3,000. If the molecular weight is too low, the plasticizer exudes due to heat or rain over time so that the initial physical properties cannot be maintained for a long period of time, and the alkyd coating properties cannot be improved. If the molecular weight is too high, the viscosity becomes high and the workability is deteriorated. The molecular weight distribution of the polymer plasticizer is not particularly limited, and is preferably narrow; the molecular weight distribution is preferably less than 1.80, more preferably 1.70 or less, still more preferably 1.60 or less, even more preferably 1.50 or less, particularly preferably 1.40 or less, and most preferably 1.30 or less.

The number average molecular weight is measured by the GPC method in the case of a vinyl polymer, and is measured by the terminal group analysis in the case of a polyether polymer. Also, the molecular weight distribution (Mw/Mn) is measured by the GPC method (relative to polystyrene standards).

A single plasticizer may be used alone, or two or more plasticizers may be used in combination. Also, a low-molecular-weight plasticizer and a polymer plasticizer may be used in combination. The plasticizer may also be added at the time of polymer production.

The amount of the plasticizer to be used, for each 100 parts by weight in total of components (A) and (B), is 5 to 150 parts by weight, preferably 10 to 120 parts by weight, and more preferably 20 to 100 parts by weight. If the amount is less than 5 parts by weight, the effect of the plasticizer cannot be obtained. If the amount is more than 150 parts by weight, the mechanical strength of the cured product is insufficient.

Thermoexpandable hollow microspheres as described in JP-A 2004-51701, JP-A 2004-66749 and others, may also be used. A thermoexpandable hollow microsphere is a plastic sphere obtained by spherically enclosing a low boiling point compound such as a C1 to C5 hydrocarbon in a polymer shell material (a vinylidene chloride copolymer, acrylonitrile copolymer, or vinylidene chloride-acrylonitrile copolymer). The thermoexpandable hollow microspheres serve as follows. When a region bonded with such a composition is heated, the gas pressure inside the shell of the thermoexpandable hollow microsphere increases while the polymer shell material softens, which results in a dramatic expansion of the volume causing delamination at the adhesive interface. The addition of the thermoexpandable hollow microspheres makes it possible to obtain, without using any organic solvent, a thermally peelable adhesive composition that, at the time of disposal, can be easily peeled just by heating and without causing material fracture.

The amount of the thermoexpandable hollow microspheres to be used, for each 100 parts by weight in total of components (A) and (B), is 0.01 to 5 parts by weight, preferably 0.1 to 3 parts by weight, and more preferably 0.2 to 2 parts by weight. With more than 5 parts by weight, the viscosity increases so that the workability is reduced, and the elongation of the cured product also greatly declines. Conversely, with less than 0.01 parts by weight, the effects of the hollow microspheres with regard to the spatula coating workability and the specific gravity reduction are reduced.

An aminosilane may be added in the curable composition of the present invention. An aminosilane is a compound that contains an amino group and a reactive silyl group within the molecule and is generally known as an adhesion promoter. This aminosilane provides a great improvement in adhesion under primed and unprimed conditions when used with a variety of adherends, i.e., inorganic substrates such as glass, aluminum, stainless steel, zinc, copper, and mortar, as well as organic substrates such as vinyl chloride, acrylic, polyester, polyethylene, polypropylene, and polycarbonate. A particularly significant improvement in adhesion to a variety of adherends is obtained when the aminosilane is used under unprimed conditions. In addition, this compound can function as other agents such as a physical-property modifier and a dispersion improver for inorganic filler.

Specific examples of the reactive silyl group in the aminosilane include the groups mentioned earlier, and for example, a methoxy group and an ethoxy group are preferred in terms of the hydrolysis rate. Preferably, at least 2, particularly preferably at least 3 hydrolyzable groups are present. Specific examples of the aminosilane include: amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine, as well as ketimine-type silanes such as N-(1,3-dimethyl-butylidene)-3-(triethoxysilyl)-1-propaneamine.

The following are preferred among the preceding for securing good adhesion: γ-aminopropyltrimethoxysilane, γ-(2-aminoethyl)aminopropyltrimethoxysilane, and γ-(2-aminoethyl)aminopropylmethyldimethoxysilane. A single aminosilane may be used alone or two or more may be used in combination. The γ-(2-aminoethyl)aminopropyltrimethoxysilane has been reported to be more irritating than other aminosilanes, and the irritation can be reduced by combining γ-aminopropyltrimethoxysilane to make up for the reduced amount of the former aminosilane.

The amount of the aminosilane to be added, for each 100 parts by weight in total of components (A) and (B), is preferably about 1 to 20 parts by weight, and more preferably 2 to 10 parts by weight. If the amount of aminosilane is less than 1 part by weight, sufficient adhesion may not be obtained. Conversely, if the amount is more than 20 parts by weight, the cured product may become brittle so that sufficient strength cannot be obtained and the curing rate may also be slow.

Adhesion promoters other than aminosilanes can be used in the composition of the present invention.

Specific examples of the non-aminosilane adhesion promoters include: epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; isocyanate group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane, and (isocyanatomethyl)dimethoxymethylsilane; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, and mercaptomethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinylically unsaturated group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanurate silanes such as tris(trimethoxysilyl)isocyanurate. Condensates obtained by partial condensation of the preceding silanes may also be used. Moreover, derivatives obtained by modifying the preceding can be used as silane coupling agents, e.g., amino-modified silyl polymers, silylated amino polymers, unsaturated aminosilane complexes, phenylamino-long chain-alkylsilanes, aminosilylated silicones, and silylated polyesters. The silane coupling agent, when used in the present invention, is typically in the range of 0.1 to 20 parts by weight for each 100 parts by weight in total of the reactive silyl group-containing organic polymer (A) and organic polymer (B). In particular, it is preferably used in the range of 0.5 to 10 parts by weight.

The effect of the silane coupling agent added into the curable composition of the present invention is to provide a great improvement in adhesion under primed and unprimed conditions when used with a variety of adherends, i.e., inorganic substrates such as glass, aluminum, stainless steel, zinc, copper, and mortar, as well as organic substrates such as vinyl chloride, acrylic, polyester, polyethylene, polypropylene, and polycarbonate. A particularly significant improvement in adhesion to a variety of adherends is obtained when the silane coupling agent is used under unprimed conditions. Specific examples of those other than silane coupling agents include, but not limited to, epoxy resins, phenolic resins, sulfur, alkyl titanates, and aromatic polyisocyanates. Each of the adhesion promoters may be used alone or two or more may be used in admixture. The addition of such an adhesion promoter can improve the adhesion to an adherend.

Among the preceding, γ-glycidoxypropyltrimethoxysilane, γ-glycidoxypropyltriethoxysilane, and γ-glycidoxypropylmethyldimethoxysilane are preferred for securing good adhesion.

The amount of the adhesion promoter to be used, for each 100 parts by weight in total of the organic polymers (A) and (B), is preferably about 0.01 to 20 parts by weight, more preferably about 0.1 to 10 parts by weight, and particularly preferably about 1 to 7 parts by weight. When the amount of the adhesion promoter is below this range, sufficient adhesion may not be obtained. Conversely, when the amount of the adhesion promoter is above this range, practical depth curability may not be obtained.

Adhesion promoters other than the adhesion promoters mentioned above include, but not limited to, epoxy resins, phenolic resins, sulfur, alkyl titanates, and aromatic polyisocyanates. Each of these adhesion promoters may be used alone or two or more may be used in admixture. However, since the epoxy resin may lower the catalytic activity depending on the added amount, a small amount of the epoxy resin is preferably added into the curable composition of the present invention. The amount of the epoxy resin to be used, for each 100 parts by weight in total of components (A) and (B), is preferably not more than 5 parts by weight, and more preferably not more than 0.5 parts by weight, and it is particularly preferable that substantially no epoxy resin be contained.

An antioxidant (age resister) may be used in the composition provided by the present invention. The use of an antioxidant can enhance the heat resistance of the cured product. Examples of the antioxidant include hindered phenol antioxidants, monophenol antioxidants, bisphenol antioxidants, and polyphenol antioxidants, and particularly preferred are hindered phenol antioxidants. Other examples include the following hindered amine light stabilizers: TINUVIN 622LD, TINUVIN 144, CHIMASSORB 944LD, and CHIMASSORB 119FL (all are products of BASF Japan Ltd.); MARK LA-57, MARK LA-62, MARK LA-67, MARK LA-63, and MARK LA-68 (all are products of ADEKA CORPORATION); and SANOL LS-770, SANOL LS-765, SANOL LS-292, SANOL LS-2626, SANOL LS-1114, and SANOL LS-744 (all are products of Sankyo Lifetech Co., Ltd.). Other specific examples of the antioxidant include those described in JP-A H04-283259 and JP-A H09-194731. The amount of the antioxidant to be used, for each 100 parts by weight in total of components (A) and (B), is preferably in the range of 0.1 to 10 parts by weight, and more preferably 0.2 to 5 parts by weight.

A light stabilizer may be used in the curable composition provided by the present invention. The use of a light stabilizer can prevent photooxidative degradation of the cured product. Examples of the light stabilizer include benzotriazole compounds, hindered amine compounds, and benzoate compounds, and particularly preferred are hindered amine compounds. The amount of the light stabilizer to be used, for each 100 parts by weight in total of components (A) and (B), is preferably in the range of 0.1 to 10 parts by weight, and more preferably 0.2 to 5 parts by weight. Specific examples of the light stabilizer include those described in JP-A H09-194731.

When the curable composition provided by the present invention is combined with a photo-curable substance, and in particular an unsaturated acrylic compound, a tertiary amine-containing hindered amine light stabilizer is preferably used as the hindered amine light stabilizer in order to improve the storage stability of the composition, as described in JP-A H05-70531. Examples of the tertiary amine-containing hindered amine light stabilizer include light stabilizers such as TINUVIN 622LD, TINUVIN 144, and CHIMASSORB 119FL (all are products of BASF Japan Ltd.); MARK LA-57, LA-62, LA-67 and LA-63 (all are products of ADEKA CORPORATION); and SANOL LS-765, LS-292, LS-2626, LS-1114 and LS-744 (all are products of BASF Japan Ltd.).

The amount of the photo-curable substance to be used, for each 100 parts by weight in total of components (A) and (B), is preferably in the range of 0.1 to 10 parts by weight, and more preferably 0.2 to 5 parts by weight.

An ultraviolet absorber may be used in the composition provided by the present invention. The use of an ultraviolet absorber makes it possible to increase the surface weather resistance of the cured product. Examples of the ultraviolet absorber include benzophenone compounds, benzotriazole compounds, salicylate compounds, substituted tolyl compounds, and metal chelate compounds, and particularly preferred are benzotriazole compounds. The amount of the ultraviolet absorber to be used, for each 100 parts by weight in total of components (A) and (B), is preferably in the range of 0.1 to 10 parts by weight, and more preferably 0.2 to 5 parts by weight. A combination of a phenol or hindered phenol antioxidant, a hindered amine light stabilizer, and a benzotriazole ultraviolet absorber is preferably used.

A filler may be added into the composition of the present invention. Examples of the filler include reinforcing fillers such as fumed silica, precipitated silica, crystalline silica, fused silica, dolomite, silicic anhydride, hydrous silicic acid, and carbon black; fillers such as heavy calcium carbonate, colloidal calcium carbonate, magnesium carbonate, diatomite, calcined clay, clay, talc, titanium oxide, bentonite, organobentonite, ferric oxide, fine aluminum powder, flint powder, zinc oxide, activated zinc white, shirasu balloons, glass microballoons, organic microballoons of a phenol resin or a vinylidene chloride resin, and resin powders such as PVC powder and PMMA powder; and fibrous fillers such as glass fiber and filaments. When a filler is used, the amount to be used, for each 100 parts by weight in total of components (A) and (B), is 1 to 250 parts by weight, preferably 10 to 200 parts by weight.

In the case that such a filler is used in order to obtain a high strength cured product, the filler is preferably selected mainly from, for example, fumed silica, precipitated silica, crystalline silica, fused silica, dolomite, silicic anhydride, hydrous silicic acid, carbon black, surface-treated finely divided calcium carbonate, calcined clay, clay, and activated zinc white, and in this case favorable results can be obtained when it is used in the range of 1 to 200 parts by weight for each 100 parts by weight in total of components (A) and (B). In the case that the filler is used in order to obtain a cured product having low strength and great elongation at break, favorable results can be obtained when the filler is selected mainly from, for example, titanium oxide, calcium carbonates such as heavy calcium carbonate, magnesium carbonate, talc, ferric oxide, zinc oxide, and shirasu balloons, and it is then used in the range of 5 to 200 parts by weight for each 100 parts by weight in total of components (A) and (B). In general, calcium carbonate with a greater specific surface area has a larger effect in improving the tensile strength at break, the elongation at break, and the adhesiveness of the cured product. Each of these fillers may be used alone or two or more may be used in admixture. When calcium carbonate is used, it is desirable to combine surface-treated finely divided calcium carbonate with a calcium carbonate having a large particle size such as heavy calcium carbonate. The surface-treated finely divided calcium carbonate preferably has a particle size of not more than 0.5 µm, and is preferably surface-treated with a fatty acid or a fatty acid salt. The large particle size calcium carbonate preferably has a particle size of at least 1 µm, and may not be surface-treated.

It is preferable to add organic balloons or inorganic balloons so as to improve the workability (e.g. coating workability) of the composition and to provide a matte surface to the cured product. The surfaces of these fillers may be treated. Each of these fillers may be used alone, or two or more may be used in admixture. In order to improve the workability (e.g. coating workability), the particle size of balloons is preferably 0.1 mm or smaller. In order to provide a matte surface to the cured product, the particle size is preferably 5 to 300 µm.

Since, for example, the composition of the present invention gives a cured product with favorable chemical resistance, the composition can be suitably applied to adhesives for the joints of exterior walls of houses such as siding boards, particularly ceramic siding boards, adhesives for exterior wall tiles, adhesives for exterior wall tiles which are intended to remain in the joints as they are, and the like. Here, it is desirable to bring the design of a sealing material in line with the exterior wall design. In particular, there have been used exterior walls with luxurious feeling created by, for example, sputter coating or the addition of colored aggregates. When a scaly or particulate substance having a diameter of 0.1 mm or greater, preferably about 0.1 to 5.0 mm, is added into the composition of the present invention, then the composition can have the advantage that the cured product matches up with such luxurious exterior walls and also shows good chemical resistance so that the cured product can maintain the appearance for a long time. When a particulate substance is used, a sanded or sandstone-like coarse surface can be formed. When a scaly substance is used, an irregular surface resulting from its scaly shape can be formed.

As described in JP-A H09-53063, the preferred diameter, amount, material and other conditions of the scaly or particulate substance are as follows.

The preferred diameter is 0.1 mm or larger, more preferably about 0.1 to 5.0 mm, and can be appropriately selected according to the material, pattern, or the like of the exterior wall. Those with a diameter of about 0.2 to 5.0 mm or about 0.5 to 5.0 mm are also usable. In the case of a scaly substance, the thickness of the substance should be about $1/10$ to $1/5$ of the diameter (that is, the thickness is about 0.01 to 1.00 mm). The scaly or particulate substance is previously mixed with a sealant base mixture to give a sealing material before transportation to the work site, or is mixed with a sealant base mixture at the work site before use.

The scaly or particulate substance is added in an amount of about 1 to 200 parts by weight for each 100 parts by weight of the composition such as a sealant composition or an adhesive composition. The amount to be added is appropriately selected according to the particular size of the scaly or particulate substance, the material and pattern of the exterior wall, and the like.

Examples of the scaly or particulate substance include natural substances such as silica sand and mica, synthetic rubber, synthetic resin, and inorganic materials such as alumina. To improve the design quality of the joint filled with the composition, the scaly or particulate substance is colored a suitable color according to the material, pattern and the like of the exterior wall.

Also, if balloons (preferably with an average particle size of 0.1 mm or larger) are used for the same purpose, a sanded or sandstone-like coarse surface can be formed and at the same time the weight can be reduced. As described in JP-A H10-251618, the preferred diameter, amount, material and other conditions of the balloons are as follows.

Balloons are spherical filler having a hollow inside. Examples of the material of the balloons include, but not limited to, inorganic materials such as glass, shirasu, and silica, and organic materials such as phenol resin, urea resin, polystyrene, and Saran. An inorganic material and an organic material may be formed into a composite or may be layered to form a multilayer. Inorganic, organic, or their composite balloons may be used. Also, a single type of balloons may be used, or a mixture of multiple types of balloons made of different materials may be used. Moreover, the surface of balloons to be used may be processed or coated, or may be treated with various surface treating agents. For example, organic balloons may be coated with calcium carbonate, talc, titanium oxide, or the like, or inorganic balloons may be surface-treated with an adhesion promoter.

To obtain a sanded or sandstone-like coarse surface, the particle size of the balloons is preferably 0.1 mm or larger. Balloons with a particle size of about 0.2 to 5.0 mm or about 0.5 to 5.0 mm are also usable. Balloons with a particle size of smaller than 0.1 mm, even when they are added in a large amount, may only increase the viscosity of the composition so that the coarse texture cannot be obtained. The amount of the balloons to be added can be easily determined according to the coarseness of the desired sanded or sandstone-like texture. In general, it is desirable to add balloons with a particle size of 0.1 mm or larger to the extent to give a volume concentration of 5 to 25% by volume in the composition. If the volume concentration of the balloons is lower than 5% by volume, no coarse texture is likely to be obtained. Conversely, if the volume concentration exceeds 25% by volume, the balloons tend to increase the viscosity of the sealing material or adhesive to reduce the workability, and also tend to increase the modulus of the cured product to deteriorate the basic performance properties of the sealing material or adhesive. The volume concentration is particularly preferably 8 to 22% by volume in terms of the balance with the basic performance properties of the sealing material.

In the case of using balloons, it is possible to add an anti-slip agent as described in JP-A 2000-154368, and an amine compound for giving a matte appearance as well as an irregular appearance to the surface of the cured product, particularly a primary and/or secondary amine with a melting point of 35° C. or higher, as described in JP-A 2001-164237.

Specific examples of the balloons include ones described in JP-A H02-129262, JP-A H04-8788, JP-A H04-173867, JP-A H05-1225, JP-A H07-113073, JP-A H09-53063, JP-A H10-251618, JP-A 2000-154368, JP-A 2001-164237, and WO 97/05201.

Also in the case where the composition of the present invention contains particles of a cured sealing material, the resulting cured product can be provided with an irregular surface to improve the design. As described in JP-A2001-115142, the preferred diameter, amount, material and other conditions of the particles of a cured sealing material are as follows. The diameter is preferably about 0.1 to 1 mm, and more preferably about 0.2 to 0.5 mm. The amount to be added is preferably 5 to 100% by weight, more preferably 20 to 50% by weight, of the curable composition. Examples of the material include urethane resin, silicone, modified silicone, polysulfide rubber and the like, and the material is not particularly limited as long as it is usable for sealing materials. Modified silicone-based sealing materials are preferred.

A silicate may also be used in the composition of the present invention. This silicate serves as a crosslinking agent and functions to improve the recovery, durability and creep resistance of the organic polymers (components (A) and (B)) in the present invention. In addition, the silicate also has the effects of improving the adhesion and water-resistant adhesion, and the durability of adhesion at high temperatures and high humidities. The silicate may be a tetraalkoxysilane or its partially hydrolyzed condensate. When a silicate is used, the amount to be used, for each 100 parts by weight in total of the organic polymers (A) and (B), is 0.1 to 20 parts by weight, preferably 0.5 to 10 parts by weight.

Specific examples of the silicate include tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetra-1-propoxysilane, tetra-n-butoxysilane, tetra-1-butoxysilane, and tetra-t-butoxysilane, and partially hydrolyzed condensates thereof.

Partially hydrolyzed condensates of tetraalkoxysilanes are more preferred because they have a greater effect in improving the recovery, durability and creep resistance in the present invention than tetraalkoxysilanes do.

Examples of the partially hydrolyzed condensates of tetraalkoxysilanes include those obtained by an ordinary method in which water is added to a tetraalkoxysilane and then partial hydrolysis and condensation are carried out. A commercially available product may also be used as the partially hydrolyzed condensate of an organosilicate compound. Specific examples of such a condensate include Methyl Silicate 51 and Ethyl Silicate 40 (both from COLCOAT CO., LTD.).

The curable composition of the present invention may optionally incorporate a physical-property modifier to modify the tensile properties of the cured product to be formed. Examples of the physical-property modifier include, but not limited to, alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane, methyltriisopropenoxysilane, and γ-glycidoxypropylmethyldiisopropenoxysilane, and functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, and γ-mercaptopropylmethyldimethoxysilane; silicone varnishes; and polysiloxanes. The use of such a physical-property modifier makes it possible to increase the hardness when the composition of the present invention is cured, or conversely reduce the hardness to enhance elongation at break. Each of the physical-property modifiers may be used alone or two or more may be used in combination.

In particular, a compound that generates a compound containing a monovalent silanol group within the molecule by hydrolysis serves to decrease the modulus of the cured product without deteriorating the stickiness on the surface of the cured product. Particularly preferred are compounds generating trimethylsilanol. Examples of the compound that generates a compound containing a monovalent silanol group within the molecule by hydrolysis include compounds disclosed in JP-A H05-117521. Other examples include compounds generating silicon compounds that are derivatives of alkyl alcohols such as hexanol, octanol, and decanol, and generate $R_3SiOH$ such as trimethylsilanol by hydrolysis; and compounds disclosed in JP-A H11-241029 which generate silicon compounds that are derivatives of polyalcohols each having three or more hydroxy groups such as trimethylolpropane, glycerol, pentaerythritol and sorbitol, and generate $R_3SiOH$ such as trimethylsilanol by hydrolysis.

Still other examples include compounds as disclosed in JP-A H07-258534 which generate silicon compounds that are derivatives of oxypropylene polymers and generate $R_3SiOH$ such as trimethylsilanol by hydrolysis; and polymers disclosed in JP-A H06-279693 which contain a cross-linkable, reactive silyl group and a silyl group that can form a monosilanol-containing compound by hydrolysis.

The physical-property modifier is used in the range of 0.1 to 20 parts by weight, preferably 0.5 to 10 parts by weight, for each 100 parts by weight in total of components (A) and (B).

The curable composition of the present invention may optionally incorporate a thixotropic agent (anti-sagging agent) to prevent sagging and improve the workability. Examples of the anti-sagging agent include, but not limited to, polyamide waxes, hydrogenated castor oil derivatives, and metal soaps such as calcium stearate, aluminum stearate, and barium stearate. Use of powdery rubber having a particle size of 10 to 500 μm as disclosed in JP-A H11-349916 or organic fibers as disclosed in JP-A 2003-155389 enables to obtain a composition that is highly thixotropic and has good workability. Each of these thixotropic agents (anti-sagging agents) may be used alone, or two or more of these may be used in combination. The thixotropic agent is used in the range of 0.1 to 20 parts by weight for each 100 parts by weight in total of components (A) and (B).

The composition of the present invention may contain a compound containing an epoxy group within the molecule. Such an epoxy group-containing compound can enhance the recovery of the cured product. Examples of the epoxy group-containing compound include epoxidized unsaturated fats and oils, epoxidized unsaturated fatty acid esters, alicyclic epoxy compounds, epichlorohydrin derivatives and other compounds, and mixtures thereof. Specific examples thereof include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. Among these, E-PS is particularly preferred. The epoxy compound is preferably used in the range of 0.5 to 50 parts by weight for each 100 parts by weight in total of components (A) and (B).

The composition of the present invention may contain a photo-curable substance. The use of a photo-curable substance results in the formation of a layer of the photo-curable substance on the surface of the cured product, thereby improving the properties of the cured product in terms of stickiness and weather resistance. The photo-curable substance is a substance that undergoes chemical changes in the molecular structure in a considerably short period of time by action of light, so that changes in the physical properties such as curing can be caused. Such substances include many known compounds such as organic monomers, oligomers, resins, and compositions containing any of them, and any commercially available ones can be used. Typical usable examples include unsaturated acrylic compounds, polyvinyl cinnamates, and azidized resins. Examples of the unsaturated acrylic compounds include monomers, oligomers, and mixtures thereof, which contain a single or multiple acrylic or methacrylic unsaturated groups; specifically, monomers such as propylene (or butylene or ethylene)glycol di(meth)acrylate, and neopentyl glycol di(meth)acrylate, and oligoesters thereof with a molecular weight of 10,000 or lower. More specific examples thereof include the special acrylates: (difunctional) Aronix M-210, Aronix M-215, Aronix M-220, Aronix M-233, Aronix M-240 and Aronix M-245; (trifunctional) Aronix M-305, Aronix M-309, Aronix M-310, Aronix M-315, Aronix M-320 and Aronix M-325; and (polyfunctional) Aronix M-400. In particular, acrylic functional group-containing compounds are preferred, and compounds containing on average 3 or more acrylic functional groups per molecule are also preferred (all Aronix products available from Toagosei Co., Ltd.).

Examples of the polyvinyl cinnamates include photosensitive resins containing cinnamoyl groups as photosensitive groups; specifically, ones resulting from esterification of polyvinyl alcohol with cinnamic acid, and many derivatives of polyvinyl cinnamate. The azidized resins are known as photosensitive resins with azide groups functioning as photosensitive groups, and include photosensitive rubber solutions typically containing a diazide compound as a photosensitizer. Detailed examples of the resins are also described in "Kankosei Jushi (Photosensitive Resins)" (published on Mar. 17, 1972 by Insatsu Gakkai Shuppanbu Ltd., p. 93 ff., p. 106 ff., and p. 117 ff.). Each of the resins may be used alone or two or more may be used in admixture, optionally along with a sensitizer. In some cases, addition of a sensitizer (e.g. ketones, nitro compounds) or an accelerator (e.g. amines) enhances the effect. The photo-curable substance is preferably used in the range of 0.1 to 20 parts by weight, and more preferably 0.5 to 10 parts by weight, for each 100 parts by weight in total of components (A) and (B). The amount of less than 0.1 parts by weight is unlikely to provide the effect of enhancing the weather resistance, whereas the amount of more than 20 parts by weight is likely to lead to too hard a cured product which tends to undergo cracking.

The composition of the present invention may contain an oxygen-curable substance. Examples of the oxygen-curable substance include unsaturated compounds that can react with oxygen in the air, and these compounds serve, for example, to prevent surface stickiness and adhesion of dirt or dust to the surface of the cured product by reacting with oxygen in the air to form a cured layer around the surface of the cured product. Specific examples of the oxygen-curable substance include drying oils such as tung oil and linseed oil, and various alkyd resins obtained by modification of such compounds; drying oil-modified acrylic polymers, epoxy resins, and silicone resins; liquid polymers such as 1,2-polybutadiene, 1,4-polybutadiene and C5-C8 diene polymers, which are obtainable by polymerizing or copolymerizing diene compounds such as butadiene, chloroprene, isoprene, and 1,3-pentadiene, liquid copolymers such as NBR and SBR, which are obtainable by copolymerizing the diene compound and a monomer copolymerizable therewith (e.g. acrylonitrile, styrene) such that the diene compound serves as the main component, and various modified products thereof (e.g. maleate-modified products, boiled-oil-modified products). Each of these may be used alone, or two or more of these may be used in combination. Among these, tung oil and liquid diene polymers are particularly preferred. The combined use with a catalyst or metal dryer for promoting the oxidative curing reaction can enhance the effect in some cases. Examples of the catalyst and metal dryer include metal salts such as cobalt naphthenate, lead naphthenate, zirconium naphthenate, cobalt octylate, and zirconium octylate, and amine compounds. The amount of the oxygen-curable substance to be used is preferably in the range of 0.1 to 20 parts by weight, and more preferably 0.5 to 10 parts by weight, for each 100 parts by weight in total of components (A) and (B). The amount of less than 0.1 parts by weight is likely to result in insufficient improvement of stain resistance, whereas the amount of more than 20 parts by weight tends to deteriorate the tensile properties of the cured product. As described in JP-A H03-160053, the oxygen-curable substance is preferably used in combination with a photo-curable substance.

The curable composition of the present invention may incorporate a flame retardant such as phosphorus-based plasticizers such as ammonium polyphosphate and tricresyl phosphate, aluminum hydroxide, magnesium hydroxide, and thermoexpandable graphite. Each of the flame retardants may be used alone, or two or more of these may be used in combination.

The flame retardant is used in the range of 5 to 200 parts by weight, preferably 10 to 100 parts by weight, for each 100 parts by weight of components (A) and (B).

The composition of the present invention may contain a solvent in order to reduce the viscosity of the composition, increase the thixotropy and improve the workability. The solvent is not particularly limited, and various compounds can be used. Specific examples thereof include hydrocarbon solvents such as toluene, xylene, heptane, hexane, and petroleum solvents; halogenated solvents such as trichloroethylene; ester solvents such as ethyl acetate and butyl acetate; ketone solvents such as acetone, methyl ethyl ketone, and methyl isobutyl ketone; alcohol solvents such as methanol, ethanol and isopropyl alcohol; and silicone solvents such as hexamethylcyclotrisiloxane, octamethylcyclotetrasiloxane, and decamethylcyclopentasiloxane. Each of these solvents may be used alone, or two or more of these may be used in combination.

When the amount of the solvent added is large, however, the toxicity to the human body may then be high, and the volume of the cured product may shrink, for instance. Therefore, the amount of the solvent to be added is preferably 3 parts by weight or less, more preferably 1 part by weight or less, and most preferably substantially zero, for each 100 parts by weight in total of components (A) and (B).

The curable composition of the present invention may optionally incorporate various additives in order to adjust physical properties of the curable composition or cured product. Examples of the additives include curability modifiers, radical inhibitors, metal deactivators, antiozonants, phosphorus-containing peroxide decomposers, lubricants, pigments, blowing agents, repellents for ants, and antifungal agents. Each of these various additives may be used alone, or two or more of these may be used in combination. Specific examples of the additives other than the ones mentioned herein are described in, for example, JP-B H04-69659, JP-B H07-108928, JP-A S63-254149, JP-A S64-22904, and JP-A 2001-72854.

The curable composition of the present invention can be prepared as a one-pack formulation which is prepared by mixing all the formulation components and storing the mixture in a hermetically closed vessel in advance, and after application, is curable by moisture in the air. Also, the curable composition can be prepared as a two-pack formulation in which a mixture of components including a curing catalyst, filler, plasticizer, and water is separately prepared as a curing agent, and then the mixture and a polymer composition are mixed just before use. In terms of workability, a one-pack formulation is preferred.

In the case where the curable composition is prepared as a one-pack formulation, since all the formulation components are mixed in advance, it is preferable that the water-containing formulation components be dehydrated and dried prior to use, or be dehydrated during mixing and kneading by, for example, the application of reduced pressure. In the case where the curable composition is prepared as a two-pack formulation, since the curing catalyst need not be mixed into the base mixture that contains the reactive silyl group-containing organic polymer, gelation is less likely even when a small amount of water remains in the mixture. However, dehydration and drying are preferably performed when long-term storage stability is required. The method for dehydration and drying is suitably, in the case of a solid such as powder, thermal drying or dehydration under reduced pressure, and, in the case of a liquid, dehydration under reduced pressure or dehydration using, for example, synthetic zeolite, active alumina, silica gel, quick lime, or magnesium oxide. In addition to these methods for dehydration and drying, a method may also be used which performs dehydration by carrying out the reaction of water with an added alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, and γ-glycidoxypropyltrimethoxysilane. Dehydration may also be performed by carrying out the reaction of water with an added oxazolidine compound such as 3-ethyl-2-methyl-2-(3-methylbutyl)-1,3-oxazolidine. Dehydration may also be performed by adding a small amount of an isocyanate compound and then reacting water with the isocyanate group. The storage stability can be improved by adding an alkoxysilane compound, an oxazolidine compound, or an isocyanate compound.

The amount of the dehydrating agent, particularly a silicon compound reactive with water (e.g. vinyltrimethoxysilane), to be used is preferably in the range of 0.1 to 20 parts by weight, and more preferably 0.5 to 10 parts by weight, for each 100 parts by weight in total of components (A) and (B).

The curable composition of the present invention can be prepared by any methods including commonly used methods such as a method in which the aforementioned components are mixed and kneaded at room temperature or under heating by a mixer, roller, kneader or the like; and a method in which the components are dissolved in a small amount of an appropriate solvent and then mixed.

When exposed to the air, the curable composition of the present invention forms a three-dimensional network structure by the action of moisture, so as to be cured into a rubbery, elastic solid.

The curable composition of the present invention can be used in applications such as pressure-sensitive adhesives; sealing materials for buildings, ships, automobiles, roads and the like; adhesives; impression materials; vibration-proof materials; damping materials; soundproof materials; expanded/foamed materials; coating compositions; and spray coatings. The cured product obtained by curing the curable composition of the present invention is excellent in flexibility and adhesiveness, and thus the curable composition is more preferably used in sealing materials and adhesives.

The curable composition of the present invention can also be used in various applications such as electric and electronic part materials (e.g. solar cell backside sealants); electrical insulating materials (e.g. insulating coating materials for electric wires and cables); elastic adhesives; contact adhesives; spray sealants; crack repair materials; tiling adhesives; powder coating compositions; casting materials; rubber materials for medical use; pressure-sensitive adhesives for medical use; sealing materials for medical devices; food packaging materials; joint sealing materials for siding boards and other exterior materials; coating materials; primers; electromagnetic-wave-shielding conductive materials; thermally conductive materials; hot melt materials; potting agents for electrics and electronics; films; gaskets; various molding materials; rustproof and waterproof encapsulants for wired glass or laminated glass edges (cut end faces); and liquid sealants for use in automotive parts, electrical machinery parts, various machinery parts and the like. Further, the curable composition can also be used as various sealing compositions and adhesive compositions because it, either alone or with the aid of a primer, can adhere to a wide range of substrates such as glass, ceramics, wood, metals and resin moldings. In addition, the curable composition of the present invention can also be used as adhesives for interior panels, adhesives for exterior panels, tiling adhesives, stone pitching adhesives, ceiling finishing adhesives, floor finishing adhesives, wall finishing adhesives, vehicle panel adhesives, adhesives for electric/electronic/precision device assembling, direct glazing sealants, double glazing sealants, sealing materials for SSG systems, and sealing materials for working joints in buildings.

EXAMPLES

The present invention is specifically described referring to the following examples and comparative examples, but the present invention is not limited by these.

Synthesis Example 1

Propylene oxide was polymerized using a polyoxypropylene diol with a molecular weight of about 3,000 as the initiator and a zinc hexacyanocobaltate glyme complex catalyst to provide a polypropylene oxide having a number average molecular weight of about 17,000 (polystyrene equivalent molecular weight measured using a TOSOH model HLC-8120 GPC solvent delivery system, a TOSOH model TSK-GEL H type column, and THF as the solvent). This hydroxy group-terminated polypropylene oxide had a number average molecular weight determined based on the amount of hydroxy groups of 11,000. Then, 1.2 equivalents of NaOMe in methanol per hydroxy group of the hydroxy group-terminated polypropylene oxide was added, the methanol was distilled off, and allyl chloride was then added to convert the terminal hydroxy group to an allyl group.

An amount of 100 parts by weight of the resulting unpurified allyl-terminated polypropylene oxide was mixed and stirred with 300 parts by weight of n-hexane and 300 parts by weight of water and the water was then removed by centrifugation. The resulting hexane solution was mixed and stirred with an additional 300 parts by weight of water, the water was again removed by centrifugation, and then the hexane was removed by evaporation under reduced pressure. This yielded a polypropylene oxide containing a terminal allyl group and having a number average molecular weight determined relative to polystyrene standards by GPC of about 17,000.

Using as catalyst 150 ppm of a platinum-vinylsiloxane complex in isopropanol (platinum content: 3% by weight), 100 parts by weight of the obtained allyl group-terminated polypropylene oxide was reacted with 1.3 parts by weight of methyldimethoxysilane at 90° C. for 2 hours to provide a polyoxypropylene polymer (polymer A) containing on average approximately 1.3 terminal methyldimethoxysilyl groups.

Synthesis Example 2

Propylene oxide was polymerized using a polyoxypropylene diol with a molecular weight of about 15,000 as the initiator and a zinc hexacyanocobaltate glyme complex catalyst to provide a polypropylene oxide having a number average molecular weight of about 30,000 (measured by the same method as above). This hydroxy group-terminated polypropylene oxide had a number average molecular weight determined based on the amount of hydroxy groups of 20,000. Then, 1.2 equivalents of NaOMe in methanol per hydroxy group of the hydroxy group-terminated polypropylene oxide was added, the methanol was distilled off, and allyl chloride was then added to convert the terminal hydroxy group to an allyl group.

An amount of 100 parts by weight of the resulting unpurified allyl-terminated polypropylene oxide was mixed and stirred with 300 parts by weight of n-hexane and 300 parts by weight of water and the water was then removed by centrifugation. The resulting hexane solution was mixed and stirred with an additional 300 parts by weight of water, the water was again removed by centrifugation, and then the hexane was removed by evaporation under reduced pressure. This yielded a polypropylene oxide containing a terminal allyl group and having a number average molecular weight determined relative to polystyrene standards by GPC of about 30,000.

Using as catalyst 150 ppm of a platinum-vinylsiloxane complex in isopropanol (platinum content: 3% by weight), 100 parts by weight of the obtained allyl group-terminated polypropylene oxide was reacted with 0.96 parts by weight of methyldimethoxysilane at 90° C. for 2 hours to provide a polyoxypropylene polymer (polymer B) containing on average approximately 1.6 terminal methyldimethoxysilyl groups.

Synthesis Example 3

Propylene oxide was polymerized using a polyoxypropylene glycol monobutyl ether with a molecular weight of about 1,200 (SANYO CHEMICAL INDUSTRIES, LTD., product name: NEWPOL LB-285) as the initiator and a zinc hexacyanocobaltate glyme complex catalyst to provide a polypropylene oxide having a number average molecular weight of about 4,800 (measured by the same method as above). This polypropylene oxide had a number average molecular weight of 3,000 when the number average molecular weight was determined based on the amount of hydroxy groups and the structure such that the polypropylene oxide had a hydroxy group at only one terminal. Then, 1.2 equivalents of NaOMe in methanol per hydroxy group of the hydroxy group-containing polypropylene oxide was added, the methanol was distilled off, and allyl chloride was then added to convert the terminal hydroxy group to an allyl group.

An amount of 100 parts by weight of the resulting unpurified polypropylene oxide having an allyl group at only one terminal was mixed and stirred with 300 parts by weight of n-hexane and 300 parts by weight of water and the water was then removed by centrifugation. The resulting hexane solution was mixed and stirred with an additional 300 parts by weight of water, the water was again removed by centrifugation, and then the hexane was removed by evaporation under reduced pressure. This yielded a polypropylene oxide having an allyl group at one terminal and having a number average molecular weight determined relative to polystyrene standards by GPC of about 4,800.

Using as catalyst 150 ppm of a platinum-vinylsiloxane complex in isopropanol (platinum content: 3% by weight), 100 parts by weight of the obtained polypropylene oxide having an allyl group at only one terminal was reacted with 3.0 parts by weight of methyldimethoxysilane at 90° C. for 2 hours to provide a polyoxypropylene polymer (polymer C) containing on average approximately 0.8 methyldimethoxysilyl groups per molecule.

Synthesis Example 4

Propylene oxide was polymerized using a polyoxypropylene glycol monobutyl ether with a molecular weight of about 1,200 (SANYO CHEMICAL INDUSTRIES, LTD., product name: NEWPOL LB-285) as the initiator and a zinc hexacyanocobaltate glyme complex catalyst to provide a polypropylene oxide having a number average molecular weight of about 7,500 (measured by the same method as above). This polypropylene oxide had a number average molecular weight of 5,000 when the number average molecular weight was determined based on the amount of hydroxy groups and the structure such that the polypropylene oxide had a hydroxy group at only one terminal. Then, 1.2 equivalents of NaOMe in methanol per hydroxy group of the hydroxy group-containing polypropylene oxide was added, the methanol was distilled off, and allyl chloride was then added to convert the terminal hydroxy group to an allyl group.

An amount of 100 parts by weight of the resulting unpurified polypropylene oxide having an allyl group at only one terminal was mixed and stirred with 300 parts by weight of n-hexane and 300 parts by weight of water and the water was then removed by centrifugation. The resulting hexane solution was mixed and stirred with an additional 300 parts by weight of water, the water was again removed by centrifugation, and then the hexane was removed by evaporation under reduced pressure. This yielded a polypropylene oxide having an allyl group at one terminal and having a number average molecular weight determined relative to polystyrene standards by GPC of about 7,500.

Using as catalyst 150 ppm of a platinum-vinylsiloxane complex in isopropanol (platinum content: 3% by weight), 100 parts by weight of the obtained polypropylene oxide having an allyl group at only one terminal was reacted with 2.0 parts by weight of methyldimethoxysilane at 90° C. for 2 hours to provide a polyoxypropylene polymer (polymer D) containing on average approximately 0.8 methyldimethoxysilyl groups per molecule.

Synthesis Example 5

Propylene oxide was polymerized using a polyoxypropylene glycol monobutyl ether with a molecular weight of about 1,200 (SANYO CHEMICAL INDUSTRIES, LTD., product name: NEWPOL LB-285) as the initiator and a zinc hexacyanocobaltate glyme complex catalyst to provide a polypropylene oxide having a number average molecular weight of about 14,600 (measured by the same method as above). This polypropylene oxide had a number average molecular weight of 10,000 when the number average molecular weight was determined based on the amount of hydroxy groups and the structure such that the polypropylene oxide had a hydroxy group at only one terminal. Then, 1.2 equivalents of NaOMe in methanol per hydroxy group of the hydroxy group-containing polypropylene oxide was added, the methanol was distilled off, and allyl chloride was then added to convert the terminal hydroxy group to an allyl group.

An amount of 100 parts by weight of the resulting unpurified polypropylene oxide having an allyl group at only one terminal was mixed and stirred with 300 parts by weight of n-hexane and 300 parts by weight of water and the water was then removed by centrifugation. The resulting hexane solution was mixed and stirred with an additional 300 parts by weight of water, the water was again removed by centrifugation, and then the hexane was removed by evaporation under reduced pressure. This yielded a polypropylene oxide having an allyl group at one terminal and having a number average molecular weight determined relative to polystyrene standards by GPC of about 14,600.

Using as catalyst 150 ppm of a platinum-vinylsiloxane complex in isopropanol (platinum content: 3% by weight), 100 parts by weight of the obtained polypropylene oxide having an allyl group at only one terminal was reacted with 0.9 parts by weight of methyldimethoxysilane at 90° C. for 2 hours to provide a polyoxypropylene polymer (polymer E) containing on average approximately 0.8 methyldimethoxysilyl groups per molecule.

Synthesis Example 6

Propylene oxide was polymerized using an initiator that was a mixture of a polyoxypropylene diol having a number average molecular weight of about 3,000 and n-butanol at a weight ratio of 70:1, respectively, and a zinc hexacyanocobaltate glyme complex catalyst. Analysis by GPC indicated the presence of two polymers having different molecular weights. As a result of the determination of the polystyrene equivalent molecular weight as in Synthesis Example 1, the number average molecular weight of the two polymers as a whole was approximately 23,000. As a result of the determination of the polystyrene equivalent molecular weight of each of these components, the higher molecular weight component had a number average molecular weight of about 25,500 and the lower molecular weight component had a number average molecular weight of about 15,000. Then, 1.2 equivalents of NaOMe in methanol per hydroxy group of the hydroxy group-containing polypropylene oxides was added, the methanol was distilled off, and allyl chloride was then added to convert the terminal hydroxy group to an allyl group.

An amount of 100 parts by weight of the resulting unpurified allyl group-containing polypropylene oxides was mixed and stirred with 300 parts by weight of n-hexane and 300 parts by weight of water and the water was then removed by centrifugation. The resulting hexane solution was mixed and stirred with an additional 300 parts by weight of water, the water was again removed by centrifugation, and then the hexane was removed by evaporation under reduced pressure. This yielded a mixture of allyl group-containing polypropylene oxides that had number average molecular weights determined relative to polystyrene standards by GPC of about 25,500 and about 15,000.

Using as catalyst 150 ppm of a platinum-vinylsiloxane complex in isopropanol (platinum content: 3% by weight), 100 parts by weight of the obtained allyl group-containing polypropylene oxides was reacted with 0.9 parts by weight of methyldimethoxysilane at 90° C. for 2 hours to provide a polyoxypropylene polymer mixture (polymer F) containing on average approximately 1.4 methyldimethoxysilyl groups per molecule.

Synthesis Example 7

Propylene oxide was polymerized using an initiator that was a mixture of a polyoxypropylene diol having a number average molecular weight of about 3,000 and a polyoxypropylene glycol monobutyl ether having a molecular weight of about 1,200 (SANYO CHEMICAL INDUSTRIES, LTD., product name: NEWPOL LB-285) at a weight ratio of 19:7, respectively, and a zinc hexacyanocobaltate glyme complex catalyst. Analysis by GPC indicated the presence of two polymers having different molecular weights. As a result of the determination of the polystyrene equivalent molecular weight as in Synthesis Example 1, the number average molecular weight of the two polymers as a whole was approximately 18,400. As a result of the determination of the polystyrene equivalent molecular weight of each of these components, the higher molecular weight component had a number average molecular weight of about 21,000 and the lower molecular weight component had a number average molecular weight of about 10,500. Then, 1.2 equivalents of NaOMe in methanol per hydroxy group of the hydroxy group-containing polypropylene oxides was added, the methanol was distilled off, and allyl chloride was then added to convert the terminal hydroxy group to an allyl group.

An amount of 100 parts by weight of the resulting unpurified allyl group-containing polypropylene oxides was mixed and stirred with 300 parts by weight of n-hexane and 300 parts by weight of water and the water was then removed by centrifugation. The resulting hexane solution was mixed and stirred with an additional 300 parts by weight of water, the water was again removed by centrifugation, and then the hexane was removed by evaporation under reduced pressure. This yielded a mixture of allyl group-containing polypropylene oxides that had number average molecular weights determined relative to polystyrene standards by GPC of about 21,000 and about 10,500.

Using as catalyst 150 ppm of a platinum-vinylsiloxane complex in isopropanol (platinum content: 3% by weight), 100 parts by weight of the obtained allyl group-containing polypropylene oxides was reacted with 1.2 parts by weight of methyldimethoxysilane at 90° C. for 2 hours to provide a polyoxypropylene polymer mixture (polymer G) containing on average approximately 1.4 methyldimethoxysilyl groups per molecule.

Synthesis Example 8

Propylene oxide was polymerized using a polyoxypropylene triol with a molecular weight of about 3,000 as the initiator and a zinc hexacyanocobaltate glyme complex catalyst to provide a polypropylene oxide having a number average molecular weight of about 26,000 (measured by the same method as above). This hydroxy group-terminated polypropylene oxide had a number average molecular weight determined based on the amount of hydroxy groups of 19,000. Then, 1.2 equivalents of NaOMe in methanol per hydroxy group of the hydroxy group-terminated polypropylene oxide was added, the methanol was distilled off, and allyl chloride was then added to convert the terminal hydroxy group to an allyl group.

An amount of 100 parts by weight of the resulting unpurified allyl-terminated polypropylene oxide was mixed and stirred with 300 parts by weight of n-hexane and 300 parts by weight of water and the water was then removed by centrifugation. The resulting hexane solution was mixed and stirred with an additional 300 parts by weight of water, the water was again removed by centrifugation, and then the hexane was removed by evaporation under reduced pressure. This yielded an allyl group-terminated polypropylene oxide that had a number average molecular weight determined relative to polystyrene standards by GPC of about 26,000.

Using as catalyst 150 ppm of a platinum-vinylsiloxane complex in isopropanol (platinum content: 3% by weight), 100 parts by weight of the obtained allyl group-terminated polypropylene oxide was reacted with 1.3 parts by weight of methyldimethoxysilane at 90° C. for 2 hours to provide a polyoxypropylene polymer (polymer H) containing on average approximately 2.4 terminal methyldimethoxysilyl groups.

Example 1

The following were mixed and thoroughly kneaded: 70 parts by weight of the polyoxyalkylene polymer (polymer B) obtained in Synthesis Example 2 and containing on average 1.6 reactive silyl groups per molecule; 30 parts by weight of the polyoxyalkylene polymer (polymer C) obtained in Synthesis Example 3 and containing on average 0.8 reactive silyl groups per molecule; 55 parts by weight of diisodecyl phthalate (J-PLUS Co., Ltd., product name: DIDP) as plasticizer; 120 parts by weight of surface-treated colloidal calcium carbonate (Shiraishi Kogyo Kaisha, Ltd., product name: Hakuenka CCR); 20 parts by weight of titanium oxide (ISHIHARA SANGYO KAISHA, LTD., product name: TIPAQUE R-820); 2 parts by weight of an anti-sagging agent (Kusumoto Chemicals, Ltd., product name: DISPARLON 6500); 1 part by weight of a benzotriazole ultraviolet absorber (BASF Japan Ltd., product name: TINUVIN 326); and 1 part by weight of a hindered amine light stabilizer (Sankyo Lifetech Co., Ltd., product name: SANOL LS-770). This was followed by dispersion by passage three times through a three-roll paint mill, and then standing overnight at 23° C. and 50% RH to provide a base mixture. After the viscosity of this base mixture was measured, 2 parts by weight of vinyltrimethoxysilane (Momentive Performance Materials Inc., product name: Silquest A-171) as dehydrating agent, 3 parts by weight of γ-(2-aminoethyl)aminopropyltrimethoxysilane (Momentive Performance Materials Inc., product name: Silquest A-1120) as adhesion promoter, and 2 parts by weight of dibutyltin bisacetylacetonate (Nitto Kasei Co., Ltd., product name: NEOSTANN U-220H) as curing catalyst were added and the mixture was kneaded to obtain a curable composition. The skin formation time, the hardness after 3 and 7 days, the dumbbell tensile properties, and the gel fraction were measured on this curable composition using the methods described below.

Examples 2 to 7 and Comparative Examples 1 to 9

Curable compositions were obtained by following the same procedure as in Example 1 but using the polymers shown in Table 1 in place of the polymer B and polymer C used in Example 1. The evaluation methods are given below.
(Polymer Viscosity)

Here, the viscosity was measured on just the polymer(s) used in each of the examples and comparative examples. When a combination of two polymers was measured, the polymer viscosity was measured at 23° C. after thorough mixing and thorough elimination of air. The measurements were performed using an E-type viscometer from TOKYO KEIKI INC.
(Skin Formation Time)

In an atmosphere of 23° C. and 50% RH, the curable composition was spread out with a spatula to give a thickness of about 3 mm, and then the surface of the curable composition was lightly touched with a microspatula at intervals to measure the time until the microspatula came out clean from the composition.
(Viscosity of Base Mixture)

The base mixture was filled without trapping bubbles into a 100-mL disposable cup. Using a BS-type viscometer (TOKYO KEIKI INC.) and a No. 7 rotor, the viscosity of the composition was measured at 1 rpm, 2 rpm and 10 rpm at 23° C. and 50% RH.
(Shore A Hardness)

In an atmosphere of 23° C. and 50% RH, the curable composition was spread out with a spatula to give a thickness of about 1 cm, the surface was flattened, and curing was then carried out under the same conditions. The hardness after 3 and 7 days was measured using an Asker rubber durometer type A from KOBUNSHI KEIKI CO., LTD.

(Dumbbell Tensile Properties)

The curable composition was formed into a 3 mm-thick test sheet and the test sheet was held at 23° C. and 50% RH for 3 days and then in a 50° C. dryer for 4 days so that it was completely cured. A no. 3 dumbbell was punched out of the sheet and then subjected to tensile testing at a tensile rate of 200 mm/minute using an Autograph from Shimadzu Corporation to measure the 50% modulus, 100% modulus, strength at break, and elongation at break (respectively indicated as M50, M100, TB and EB).

(Gel Fraction)

The cured product in the area remaining after the dumbbell had been punched out for the tensile property measurement was cut into an approximately 1 cm×1 cm square and its weight was measured. It was then placed on a wire screen, immersed in acetone and held for 3 days at 23° C. The mixture was occasionally shaken so as to dissolve the soluble fraction present in the cured product into the acetone. Then, the resulting cured product was removed along with the wire screen, the acetone was completely removed at 120° C., and the change in the weight of the cured product was subsequently measured. The gel fraction was defined as a value in percent given by dividing the weight of the final cured product by the initial weight. Higher values indicate being firmly cross-linked and are more desirable.

(Weight Proportions of Individual Constituents of Organic Polymer)

The weight proportions of the individual constituents of the organic polymer were calculated by desk calculation without measurement. Taking Comparative Example 1 as an example, each molecule of polymer A has 1.3 silyl groups; moreover, this polymer is linear and thus a maximum of 2 silyl groups can ideally be introduced into the terminals. Based on these considerations, the terminal functionalization ratio is 1.3/2=0.65. When "difunctional" is defined as the polymer in which silyl is introduced at both terminals, "monofunctional" as the polymer in which silyl is introduced at only one terminal, and "zero functional" as the polymer in which no silyl group is introduced at all, these are present in proportions that follow a binomial distribution, namely, at 42.5%, 45.5% and 12.3%, respectively. Also in the case of a combination of two polymers, the determination was performed by similarly calculating the constituent ratio for each polymer and summing up the respective constituents. The weight proportions of the individual constituents are given in percent in Table 1.

(Molar Proportions of Individual Constituents of Organic Polymer)

These were also calculated by desk calculation as above. When a combination of two polymers is used and their molecular weights are different, their constituent ratio is preferably considered based on the number of polymers, i.e., in moles. Therefore, from values obtained by dividing the weight of each constituent obtained as described above by the number average molecular weight determined based on the amount of hydroxy groups, the molar proportions of the individual constituents were determined in percent.

The formulations in the examples and comparative examples and their physical properties are shown in Table 1.

TABLE 1

| | Comparative Example 1 | Comparative Example 2 | Example 1 | Comparative Example 3 | Comparative Example 4 | Example 2 | Comparative Example 5 | Comparative Example 6 | Example 3 | Example 4 | Example 5 | Comparative Example 7 | Comparative Example 8 | Example 6 | Example 7 | Comparative Example 9 |
|---|---|---|---|---|---|---|---|---|---|---|---|---|---|---|---|---|
| Polymer A | 100 | | | | | | | | | | | | | | | |
| Polymer B | | 100 | | | | | | | | | | | | | | |
| Polymer C | | | 70 | 50 | 30 | 70 | 50 | 30 | 90 | 70 | 50 | 30 | | | | |
| Polymer D | | | 30 | 50 | 70 | | | | | | | | | | | |
| Polymer E | | | | | | 30 | 50 | 70 | 10 | 30 | 50 | 70 | | | | 30 |
| Polymer F | | | | | | | | | | | | | 100 | 100 | | |
| Polymer G | | | | | | | | | | | | | | | 100 | |
| Polymer H | | | | | | | | | | | | | | | | 70 |
| Phthalic acid ester plasticizer DIIDP | 55 | 55 | 55 | 55 | 55 | 55 | 55 | 55 | 55 | 55 | 55 | 55 | 55 | 55 | 55 | 55 |
| Colloidal calcium carbonate CCR | 120 | 120 | 120 | 120 | 120 | 120 | 120 | 120 | 120 | 120 | 120 | 120 | 120 | 120 | 120 | 120 |
| Titanium oxide R-820 | 20 | 20 | 20 | 20 | 20 | 20 | 20 | 20 | 20 | 20 | 20 | 20 | 20 | 20 | 20 | 20 |
| Anti-sagging agent DISPARLON 6500 | 2 | 2 | 2 | 2 | 2 | 2 | 2 | 2 | 2 | 2 | 2 | 2 | 2 | 2 | 2 | 2 |
| Ultraviolet absorber TINUVIN 326 | 1 | 1 | 1 | 1 | 1 | 1 | 1 | 1 | 1 | 1 | 1 | 1 | 1 | 1 | 1 | 1 |
| Light stabilizer SANOL LS-770 | 1 | 1 | 1 | 1 | 1 | 1 | 1 | 1 | 1 | 1 | 1 | 1 | 1 | 1 | 1 | 1 |
| Dehydrating agent A-171 | 2 | 2 | 2 | 2 | 2 | 2 | 2 | 2 | 2 | 2 | 2 | 2 | 2 | 2 | 2 | 2 |
| Adhesion promoter A-1120 | 3 | 3 | 3 | 3 | 3 | 3 | 3 | 3 | 3 | 3 | 3 | 3 | 3 | 3 | 3 | 3 |
| Curing catalyst NEOSTANN U-220H | 2 | 2 | 2 | 2 | 2 | 2 | 2 | 2 | 2 | 2 | 2 | 2 | 2 | 2 | 2 | 2 |
| Polymer viscosity (Pa·s) | 8 | 46 | 14 | 6 | 3 | 17 | 9 | 5 | 38 | 25 | 19 | 15 | 6 | 26 | 12 | 18 |
| Skin formation time (min) | 45 | 20 | 70 | 275 | 24 hrs or longer | 60 | 100 | 6 hrs or longer | 30 | 40 | 60 | 120 | 7 days or longer | 35 | 60 | 15 |
| Viscosity of base mixture (23° C.) | | | | | | | | | | | | | | | | |
| 1 rpm (Pa·s) | 2772 | 3180 | 2424 | 2208 | 1992 | 2712 | 2508 | 2220 | 2980 | 2760 | 3000 | 2724 | 2050 | 2700 | 2530 | 2840 |
| 2 rpm (Pa·s) | 1536 | 1740 | 1332 | 1170 | 1056 | 1470 | 1320 | 1206 | 1610 | 1482 | 1578 | 1440 | 1080 | 1440 | 1290 | 1560 |
| 10 rpm (Pa·s) | 422 | 480 | 367 | 306 | 272 | 402 | 346 | 307 | 460 | 431 | 420 | 384 | 295 | 408 | 350 | 410 |
| Shore A hardness | | | | | | | | | | | | | | | | |
| After 3 days | 18 | 17 | 2 | <1 | <1 | 8 | <1 | <1 | 15 | 10 | 3 | <1 | — | 13 | 11 | 35 |
| After 7 days | 18 | 18 | 2 | <1 | <1 | 8 | <1 | <1 | 16 | 12 | 4 | <1 | — | 15 | 12 | 37 |
| Dumbbell tensile properties | | | | | | | | | | | | | | | | |

TABLE 1-continued

| | Comparative Example 1 | Comparative Example 2 | Example 1 | Comparative Example 3 | Comparative Example 4 | Example 2 | Comparative Example 5 | Comparative Example 6 | Example 3 | Example 4 | Example 5 | Comparative Example 7 | Comparative Example 8 | Example 6 | Example 7 | Comparative Example 9 |
|---|---|---|---|---|---|---|---|---|---|---|---|---|---|---|---|---|
| M50 (MPa) | 0.14 | 0.20 | 0.04 | — | Unmeasurable due to inadequate curing | 0.06 | 0.02 | Unmeasurable due to inadequate curing | 0.18 | 0.09 | 0.04 | 0.01 | Unmeasurable due to non-curing | 0.14 | 0.1 | 0.40 |
| M100 (MPa) | 0.25 | 0.32 | 0.07 | 0.01 | | 0.09 | 0.03 | | 0.27 | 0.16 | 0.07 | 0.02 | | 0.25 | 0.2 | 0.65 |
| TB (MPa) | 1.42 | 2.37 | 0.50 | 0.03 | | 0.79 | 0.19 | | 1.95 | 1.19 | 0.50 | 0.07 | — | 2.10 | 1.34 | 2.00 |
| EB (%) | 755 | 1025 | 1120 | 1375 | | 1065 | 1265 | | 1040 | 1020 | 1135 | 1665 | | 1090 | 900 | 590 |
| Gel fraction (%) | 69 | 74 | 53 | 0 | 0 | 62 | 12 | 0 | 70 | 67 | 54 | 4 | 0.0 | 69 | 66 | 80 |
| Weight proportions of constituents of organic polymer(s) difunctional | 42.3 | 64.0 | 44.8 | 32.0 | 19.2 | 44.8 | 32.0 | 19.2 | 57.6 | 44.8 | 32.0 | 19.2 | 0.0 | 48.0 | 44.8 | |
| monofunctional | 45.5 | 32.0 | 46.4 | 56.0 | 65.6 | 46.4 | 56.0 | 65.6 | 36.8 | 46.4 | 56.0 | 65.6 | 80.0 | 44.0 | 46.4 | |
| zero functional | 12.3 | 4.0 | 8.8 | 12.0 | 15.2 | 8.8 | 12.0 | 15.2 | 5.6 | 8.8 | 12.0 | 15.2 | 20.0 | 8.0 | 8.8 | |
| Molar proportions of constituents of organic polymer(s) difunctional (x) | 42.3 | 64.0 | 16.6 | 8.3 | 3.9 | 23.6 | 12.8 | 6.2 | 52.4 | 34.5 | 21.3 | 11.3 | 0.0 | 40.8 | 34.5 | |
| monofunctional (y) | 45.5 | 32.0 | 67.6 | 73.7 | 77.1 | 62.3 | 70.4 | 75.4 | 40.7 | 54.2 | 64.0 | 71.5 | 80.0 | 49.4 | 54.1 | |
| zero functional (%) | 12.3 | 4.0 | 15.9 | 17.9 | 19.0 | 14.1 | 16.8 | 18.5 | 6.9 | 11.4 | 14.7 | 17.2 | 20.0 | 9.8 | 11.4 | |
| Value of (y)/(x) | 1.1 | 0.5 | 4.1 | 8.8 | 19.9 | 2.6 | 5.5 | 12.2 | 0.8 | 1.6 | 3.0 | 6.3 | — | 1.2 | 1.6 | |

Since polymer A used in Comparative Example 1 had a relatively small molecular weight, it provided a low viscosity and therefore good workability; however, it is not suitable for building sealing materials, where high elongation is required. On the other hand, since polymer B used in Comparative Example 2 had a high molecular weight, it provided a cured product with sufficiently high elongation; however, the polymer viscosity was as high as 46 Pa·s and therefore its mixture also had a high viscosity at 10 rpm, indicating poor workability.

When a polymer having a silyl group at only one terminal was used in combination with polymer B in order to solve these problems, in some cases, as exemplified in Comparative Examples 4 and 6, the composition was inadequately cured even though thermal curing was carried out, and was not suitable as a curable composition at all. In addition, as shown in Comparative Examples 3, 5 and 7, the composition was apparently cured, but its hardness after 7 days was not more than 1 and the tensile strength at break of the cured product was very low, i.e. 0.2 MPa or lower, which indicates that these compositions were also unable to withstand practical use. In contrast, the compositions in Examples 1 to 5 were found to be firmly cured because the tensile strength at break in the dumbbell tensile properties was at least 0.5 MPa and the gel fraction was also at least 50%. Moreover, the results in Examples 6 and 7 demonstrate that, instead of mixing two polymers, using two initiators, i.e., a diol and a monool, in the synthesis process has the same effects. The molar ratio of the monofunctional constituent (y) to the difunctional constituent (x) in the polymer, i.e., (y)/(x), is associated with the differences between the cases indicated above. It is found that a good cured product can be formed when this ratio is not more than 5, whereas curing is inadequate when the ratio is greater than 5. Moreover, as shown in Comparative Example 9, the elongation is not enhanced when component (A) has a branched structure.

In Examples 1 to 7, the polymer viscosity was as low as not more than 25 Pa·s and good workability was therefore achieved even when other raw materials, e.g., filler, were used. In addition, the skin formation time was in a proper range and the cured product also exhibited a high elongation equal to or greater than that in Comparative Example 2, which indicates that the properties were well balanced.

INDUSTRIAL APPLICABILITY

The curable composition of the present invention can be used in applications such as pressure-sensitive adhesives; sealing materials for buildings, ships, automobiles, roads and the like; adhesives; impression materials; vibration-proof materials; damping materials; soundproof materials; expanded/foamed materials; coating compositions; and spray coatings. Since the cured product obtained by curing the curable composition of the present invention is excellent in flexibility and adhesiveness, it is more preferable to use the curable composition in sealing materials and adhesives among these applications.

The invention claimed is:

1. A curable composition, comprising:
   an organic polymer (A) containing on average at least 1.4 reactive silyl groups per molecule;
   an organic polymer (B) containing on average less than 1 reactive silyl group per molecule, and
   an organotin curing catalyst (C);
   wherein the number average molecular weight of component (B) is lower than the number average molecular weight of component (A) by at least 3,000, and
   the ratio (y)/(x) of the number of moles (y) of organic polymers each containing only one reactive silyl group per molecule among components (A) and (B) to the number of moles (x) of organic polymers each containing at least 2 reactive silyl groups per molecule among components (A) and (B) is not more than 5.

2. The curable composition according to claim 1, wherein the number average molecular weight of component (B) is at least 2,000.

3. The curable composition according to claim 1, wherein the organic polymer (A) has a linear structure.

4. The curable composition according to claim 1, wherein the backbones of components (A) and (B) are each at least one selected from a polyoxyalkylene polymer, a poly(meth)acrylic polymer and a hydrocarbon polymer.

5. The curable composition according to claim 1, wherein the backbones of components (A) and (B) are each a polyoxyalkylene polymer.

6. The curable composition according to claim 1, wherein the backbones of components (A) and (B) are each a polyoxypropylene polymer.

7. The curable composition according to claim 1, wherein component (B) is produced by introduction of a reactive silyl group into a polyoxypropylene polymer produced by reaction of propylene oxide using an initiator having only one hydroxy group per molecule in the presence of a double metal cyanide complex catalyst.

8. The curable composition according to claim 1, wherein components (A) and (B) are produced together by introduction of a reactive silyl group into polyoxypropylene polymers produced by reaction of propylene oxide using an initiator having at least 2 hydroxy groups per molecule in combination with an initiator having only one hydroxy group per molecule in the presence of a double metal cyanide complex catalyst.

9. The curable composition according to claim 1, wherein the reactive silyl groups in components (A) and (B) are both methyldimethoxysilyl groups.

10. A building sealing material, comprising the curable composition according to claim 1.

11. A siding board sealing material, comprising the curable composition according to claim 1.

* * * * *